(12) United States Patent
Ohtsuka et al.

(10) Patent No.: US 7,562,569 B2
(45) Date of Patent: Jul. 21, 2009

(54) THERMAL FLOW SENSOR HAVING AN AMPLIFIER SECTION FOR ADJUSTING THE TEMPERATURE OF THE HEATING ELEMENT

(75) Inventors: Kazuhiko Ohtsuka, Tokyo (JP); Yuji Ariyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/209,706

(22) Filed: Sep. 12, 2008

(65) Prior Publication Data

US 2009/0013777 A1    Jan. 15, 2009

Related U.S. Application Data

(62) Division of application No. 12/013,590, filed on Jan. 14, 2008, now Pat. No. 7,487,674.

(30) Foreign Application Priority Data

Nov. 22, 2005  (JP) ............................. 2005-336796

(51) Int. Cl.
  *G01F 1/68* (2006.01)
(52) U.S. Cl. .................................................. 73/204.15
(58) Field of Classification Search ........................ None
  See application file for complete search history.

(56) References Cited

U.S. PATENT DOCUMENTS

| | | | |
|---|---|---|---|
| 4,990,986 A | * | 2/1991 | Murakami et al. .......... 257/419 |
| 6,786,088 B2 | | 9/2004 | Matsumura |
| 7,010,971 B2 | | 3/2006 | Matsumoto et al. |
| 2006/0162442 A1 | | 7/2006 | Matsumoto et al. |

FOREIGN PATENT DOCUMENTS

| | | |
|---|---|---|
| DE | 4011950 A1 | 10/1990 |
| EP | 1541974 A1 | 6/2005 |
| JP | 2000-314645 A | 11/2000 |
| JP | 2002-005717 A | 1/2002 |
| JP | 2005-172463 A | 6/2005 |

OTHER PUBLICATIONS

German Office Action dated Feb. 25, 2009.

* cited by examiner

*Primary Examiner*—Harshad Patel
(74) *Attorney, Agent, or Firm*—Sughrue Mion, PLLC

(57) ABSTRACT

A thermal flow sensor can adjust the temperature of a heating element in a highly precise and reliable manner with the use of simple circuits, devices and process steps. The sensor includes an amplifier section (7) that amplifies a voltage across opposite ends of at least one of resistors (3, 4, 5) that constitute a bridge circuit, a current control section (9) that is controlled based on an output voltage of the amplifier section (7), and an output terminal (14) that is connected to one end of a heating element (1) that is controlled to be energized by the current control section (9). The amplifier section (7) includes an amplification factor control section for controlling an amplification factor by an electric signal from a computer, and uses an output voltage which has been amplified and impressed to an input voltage to an operational amplifier (8).

1 Claim, 12 Drawing Sheets

THERMAL FLOW SENSOR HAVING AN AMPLIFIER SECTION FOR ADJUSTING THE TEMPERATURE OF THE HEATING ELEMENT

This is a divisional of application Ser. No. 12/013,590 filed Jan. 14, 2008 now U.S. Pat. No. 7,487,674. The entire disclosure(s) of the prior application(s), application Ser. No. 12/013,590 is considered part of the disclosure of the accompanying divisional application and is hereby incorporated by reference.

BACKGROUND OF THE INVENTION

1. Field of the Invention

The present invention relates to a thermal flow sensor for detecting the flow rate of fluid by electrically detecting the amount of heat transmitted to the fluid from a heating element arranged therein. Particularly, the invention relates to a novel improvement in the configuration of a circuit for adjusting the temperature of the heating element.

2. Description of the Related Art

In general, in thermal flow sensors, a heating element and a fluid temperature detection element are arranged in fluid, and a bridge circuit is formed by the heating element, the fluid temperature detection element, and a plurality of resistors, where about in a heating current supplied to the heating element is controlled so as to make the bridge circuit always keep equilibrium.

As a result, the temperature of the heating element is always kept at a control temperature that is higher by a predetermined temperature than the temperature of the fluid detected by the fluid temperature detection element.

However, there exist variations in the heating element, the fluid temperature detection element, the registers, the sensor structure, etc., respectively, so it is necessary to adjust the predetermined temperature for each of individual thermal flow sensors.

In the known thermal flow sensors, to adjust the heating element to the control temperature, the resistance value of at least one of the resistors forming the bridge, circuit is adjusted.

As a adjusting method for such a resistance value, there has been widely used a method in which a resistance value necessary to obtain the predetermined temperature is calculated, and a fixed resistor having a resistance value close to the resistance value thus calculated is soldered to the bridge circuit, or a method of using a variable resistor whose resistance value can be changed by a driver or the like, or a laser trimming method in which a part of a membrane resistor is burn off by a laser so as to change its resistance value (see, for example, a first patent document: Japanese patent application laid-open No. 2000-314645).

In the known thermal flow sensors, in case where the fixed resistor is soldered for example, it is necessary to perform the calculation of an optimal resistance value, the selection of an appropriate resistor, and soldering work, so there is a problem that the number of steps required becomes large, and much time is required for adjustment.

In addition, in case where the variable resistor is used, there arises another problem that the resistance value of the variable resistor can be changed due to vibration, etc., thus resulting in a lack of accuracy.

Moreover, in case where laser trimming is applied, the apparatus becomes large in scale, and besides, the resistance value can be adjusted only in a direction from a small resistance value to a large resistance value, so an initial temperature might become too high in consideration of the case where the temperature of the heating element is to be changed in a direction from a high temperature side to a low temperature side, and there is a further problem that when an optimal value has once been exceeded, no readjustment can be made.

SUMMARY OF THE INVENTION

Accordingly, the present invention is intended to obviate the problems as referred to above, and has for its object to obtain a thermal flow sensor which is provided with an adjustment circuit capable of adjusting the temperature of a heating element in the thermal flow sensor in a highly precise and reliable manner with the use of simple circuits, devices and steps.

Bearing the above object in mind, according to the present invention, there is provided a thermal flow sensor in which a bridge circuit is composed of at least one heating element, a fluid temperature detection element, and a plurality of resistors; the heating element and the fluid temperature detection element are arranged in fluid, and the fluid temperature detection element is arranged at a location free from the influence of heat from the heating element; and a flow rate of the fluid is detected by using the fact that an amount of heat transmitted from the heating element to the fluid in a state where the heating element is always held at a control temperature higher by a predetermined value than the temperature of the fluid detected by the fluid temperature detection element depends on the flow rate of the fluid. The thermal flow sensor includes: an amplifier section that amplifies a voltage across opposite ends of at least one of the plurality of resistors; a current control section that is controlled based on an output voltage of the amplifier section; and an output terminal that is connected to one end of the heating element, which is controlled to be energized through the current control section, for outputting a detection result corresponding to the flow rate of the fluid. The amplifier section includes an amplifier part that amplifies an input signal to the amplifier section, and an amplification factor control part that controls an amplification factor of the amplifier part. The amplification factor control part changes the amplification factor of the amplifier part by means of an electric signal so that the temperature of the heating element is adjusted to the control temperature.

According to the present invention, it is possible to adjust the temperature of the heating element in the thermal flow sensor in a highly precise and reliable manner with the use of simple circuits, devices and steps.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
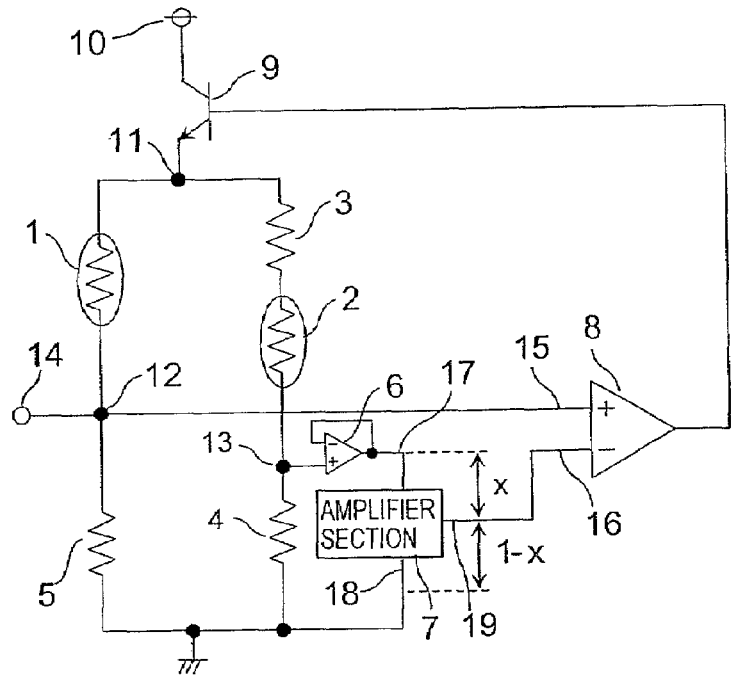
FIG. 1 is a circuit configuration diagram showing a thermal flow sensor according to a first embodiment of the present invention.

FIG. 1 is a circuit configuration diagram that shows a thermal flow sensor according to a first embodiment of the present invention, wherein the configuration of a temperature control circuit of a heating element is specifically illustrated.

In FIG. 1, a bridge circuit includes a heating element 1 that is arranged in fluid, a fluid temperature detection element 2 that is arranged in the fluid at a location free from the influence of heat from the heating element 1, and a plurality of resistors 3, 4, 5.

A first series circuit comprising the heating element 1 and the resistor 5 and a second series circuit comprising the fluid temperature detection element 2 and the resistors 3, 4 are connected in parallel with each other, and inserted between a transistor 9 connected to a power supply 10 and ground.

The heating element 1 and the fluid temperature detection element 2 are formed of a temperature sensitive resistance material such as for example platinum, nickel, etc., whose resistance value changes in accordance with the temperature thereof.

A buffer circuit 6, an amplifier section 7 and an operational amplifier 8 are connected to the bridge circuit, and the operational amplifier 8 has an output terminal connected to a base terminal of the transistor 9.

A voltage across the opposite ends of the resistor 4 is impressed to input terminals 17, 18 of the amplifier section 7 through the buffer circuit 6. The input terminal 18 of the amplifier section 7 is connected to the ground, and the output terminal 19 of the amplifier section 7 is connected to an inverting input terminal 16 of the operational amplifier 8.

Here, note that though not shown in FIG. 1, a computer 22 (to be described later) such as a personal computer, which serves as external equipment for sensor adjustment, is connected to the amplifier section 7 at the time of adjustment of the thermal flow sensor.

A voltage at a junction 12 between the heating element 1 and the resistor 5 is impressed to a non-inverting input terminal 15 of the operational amplifier 8, and the junction 12 of the heating element 1 and the resistor 5 is connected to an output terminal 14 of the thermal flow sensor, so that the output terminal 14 outputs a detection result corresponding to the flow rate of the fluid.

In this case, the amplifier section 7 is designed to divide a voltage input thereto into a ratio of "x :1−x " and output the thus divided voltage. An output voltage of the operational amplifier 8 based on the output voltage of the amplifier section 7 is impressed to the base terminal of the transistor 9, whereby the transistor 9 controls a current supplied to the heating element 1 based on the voltage input to the base terminal thereof. As a result, the heating element 1 is controlled to be energized and deenergized through the transistor 9 that is current controlled by the operational amplifier 8 (i.e., operates in an active region).

Figure 2:
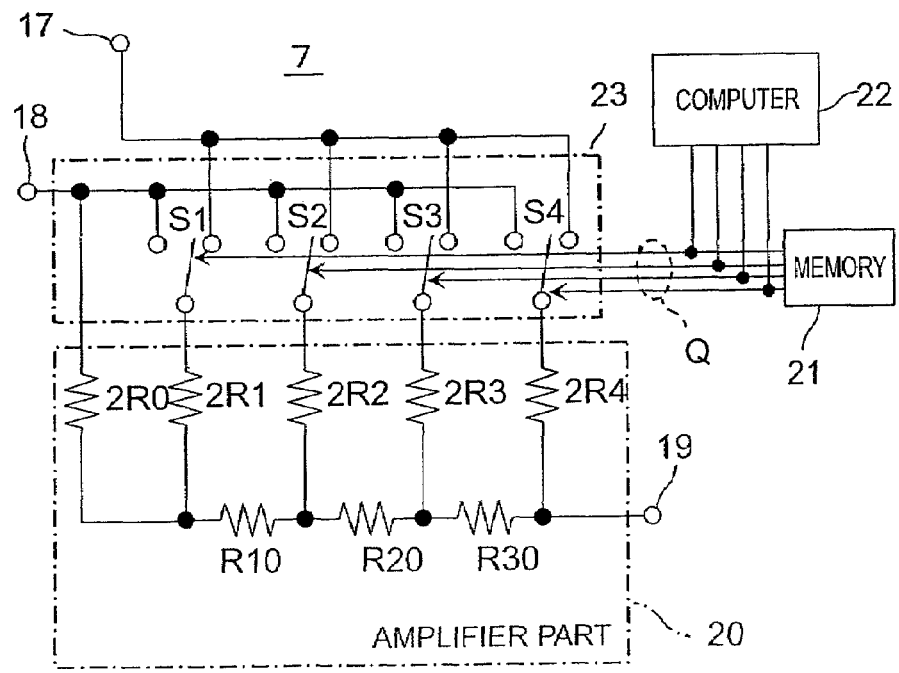
FIG. 2 is a circuit configuration diagram showing an a rich amplifier section in FIG. 1.

FIG. 2 is a circuit configuration diagram that specifically illustrates a state in which the amplifier section 7 in FIG. 1 is connected to the computer 22 (external equipment for adjustment).

In FIG. 2, the amplifier section 7 is composed of an amplifier part 20 and an amplification factor control part 23, which are arranged between the input terminals 17, 18 and the output terminal 19 of the amplifier section 7. The amplifier part 20 and the amplification factor control part 23 together constitute a so-called DA converter. The amplification factor control part 23 performs an adjustment operation by means of an electric signal Q from the computer 22 (external equipment for adjustment). Connected to the amplification factor control part 23 is a memory 21 that serves to store the electric signal Q after completion of the adjustment as data, and the electric signal Q after adjustment is supplied to the amplification factor control part 23.

The amplifier part 20 is composed of a resistor array comprising a plurality of resistors 2R0 through 2R4 connected between the input terminals 17, 18 and the output terminal 19 of the amplifier section 7, and resistors R10 through R30 inserted between adjacent junctions of the respective resistors 2R1 through 2R4. The resistor 2R0 has one end thereof connected to the input terminal 18, and the resistor 2R4 has the other end thereof connected to the output terminal 19.

The amplification factor control part 23 is composed of a plurality of switches S1 through S4 that can be electrically controlled. The individual switches S1 through S4 in the amplification factor control part 23 serve to connect, in response to the electric signal Q from the computer 22, one ends of the respective resistors 2R1 through 2R4 in the amplifier part 20 to either one of the input terminals 17, 18.

In FIG. 2, the amplifier section 7 divides the voltage input thereto (i.e., amplifies it at a ratio of 1 or less), and outputs the thus divided voltage from the output terminal 19 as an output voltage. Also, in the amplifier part 20, the resistance values of the respective resistors 2R0 through 2R4 are represented by "2R", and the resistance values of the resistors R10 through R30 are represented by "R".

Although in FIG. 2, a DA converter of 4 bits is shown as a configuration example of the amplifier section 7, it is needless to say that the number of bits of the DA converter can be arbitrarily changed as required. Also, the amplifier section 7 is shown as being composed of the DA converter of the R-2R type, but it may be composed of a DA converter of another type. Such a situation is similar in respective embodiments to be described later.

Figure 3:
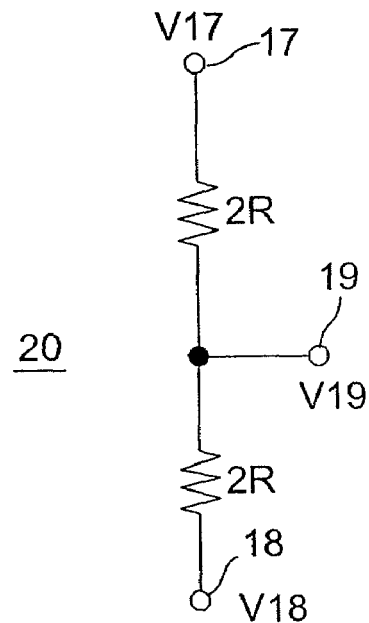
FIG. 3 is a circuit diagram showing one example of an equivalent circuit of the amplifier section shown in FIG. 2.

FIG. 3 is a circuit configuration diagram that illustrates one example of the amplifier part 20, wherein there is illustrated an equivalent circuit in case where for example, the resistors 2R1 through 2R3 are connected to the input terminal 18 by means of the switches S1 through S3, respectively, in FIG. 2, with only the resistor 2R4 being connected to the input terminal 17 by means of the switch S4. In FIG. 3, individual resistance values or combined resistance values are represented by "2R".

In this case, an output voltage V19 from the output terminal 19 is represented by the following expression (1) by using individual input voltages V17, V18 of the input terminals 17, 18.

$$V19 = \frac{2R}{4R}(V17 - V18) + V18 = \frac{1}{2}(V17 + V18) \quad (1)$$

As can be seen from expression (1), the voltage division ratio x of the amplifier section 7 is decided by the ratio of resistance values (=2R/4R=1/2), so the absolute accuracy of the resistance values is not required, and voltage division with high precision can be made as long as the relative accuracy thereof is kept.

Here, note that the general formula of the output voltage V19 becomes, as shown by the following expression (2).

$$V19 = \frac{V17 - V18}{2^4} \times N + V18 \quad (2)$$

where N is a value which represents the connection states of the switches S1 through S4 by the digital value of a decimal number.

Specifically, when a switch is connected to the input terminal 17 sidle, this state is represented by "1", whereas when a switch is connected to the input terminal 18 side, this state is represented by "0", and the switches S1, S4 are represented by "LSB" and "MSB", respectively.

When the switch S4 alone is connected to the input terminal 17 side as in the above example, this state is represented by N=1000 (binary number)=8 (decimal number). Accordingly, by assigning N=8 to expression (2), the output voltage V19 is represented by V19=(V17+V18)/2.

In addition, when the amplifier section 7 divides the input voltage into a ratio of "x:1–x", and outputs the thus divided voltage, as shown in FIG. 1, an input voltage V16 to the inverting input terminal 16 of the operational amplifier 8 is represented by using a voltage V13 at a junction 13 between the fluid temperature detection element 2 and the resistor 4, as shown by the following expression (3).

$$V16 = (1-x)V13 \quad (3)$$

Moreover, the voltage V13 is represented by using the voltage V11 at a junction 11 between the heating element 1 and the resistor 3, as shown by the following expression (4).

$$V13 = \frac{R4}{R2 + R3 + R4} V11 \quad (4)$$

where R2, R3 and R4 are the individual resistance values of the fluid temperature detection element 2 and the resistors 3, 4, respectively.

Further, an input voltage V15 to the non-inverting input terminal 15 of the operational amplifier 8 is represented by the following expression (5).

$$V15 = \frac{R5}{R1 + R5} V11 \quad (5)$$

where R1 and R5 are the individual resistance values of the heating element 1 and the resistor 5, respectively.

Here, if the input terminals 15, 16 of the operational amplifier 8 are virtually short-circuited with each other, the input voltages V15, V16 to the input terminals 15, 16 become equal to each other (V15=V16), and hence the above expression (5) is represented by the following expression (6).

$$\frac{R5}{R1 + R5} V11 = (1 - x)\frac{R4}{R2 + R3 + R4} V11 \quad (6)$$

Accordingly, the resistance value R1 of the heating element 1 is represented by the following expression (7).

$$R1 = \frac{(R1 + R3 + xR4)R5}{(1 - x)R4} \quad (7)$$

As can be seen from expression (7), by changing the voltage division ratio x of the amplifier section 7, the resistance value, i.e., the temperature, of the heating element 1 can be adjusted. The voltage division ratio x is changed by an electric signal Q input to the amplification factor control part 23 in FIG. 2.

At the time of adjustment of the amplification factor control part 23, the electric signal Q is sent from the computer 22 so as to adjust the individual switches S1 through S4, and when an optimal adjustment value is finally decided or fixed, the electric signal Q after the final decision of adjustment is stored in the memory 21 as an adjustment signal. After adjustment, by reading out an electric signal for adjustment from the memory 21 and sending it to the amplification factor control part 23, the amplification factor optimally adjusted can be reproduced. This is similar in respective embodiments to be described later. Here, note that the output voltage V19 of the amplifier section 7 is not only used as an input voltage to the operational amplifier 8 but also can be used as a voltage impressed to the other side of the bridge circuit.

As described above, according to the first embodiment of the present invention, as the temperature control circuit of the thermal flow sensor, there is provided the amplifier section 7 that serves to amplify a voltage across the opposite ends of at least one resistor among the plurality of resistors that constitute the bridge circuit, and the amplifier section 7 includes the amplifier part 20 and the amplification factor control part 23 that serves to control the amplification factor of the amplifier part 20 by an electric signal Q from the computer 22, with the amplified output voltage V19 being used as an input voltage of the operational amplifier 8. With such an arrangement, the temperature of the heating element 1 can be adjusted only by sending the electric signal Q for adjustment from the computer 22, so the adjustment can be made in a short time by a simple arrangement or configuration of the apparatus.

That is, by changing the amplification factor of the amplifier section 7 for each of the thermal flow sensors with individual variations by means of the electric signal Q from the computer 22, it is possible to adjust the temperature of the heating element 1 to a predetermined control temperature, so apparatuses for mechanical processing (soldering, laser trimming, etc.) become unnecessary. Besides, adjustment can be made while monitoring the temperature of the heating element 1 (or an index indicating the temperature), so an adjustment process or step becomes simple.

In addition, since the voltage division ratio x of the amplifier section 7 is decided by the ratio of the resistance values, as stated above, adjustment accuracy is not influenced by the absolute accuracy of the resistance values, so only the relative accuracy thereof need to be maintained, and adjustment with a high degree of precision can be achieved even if highly accurate and expensive elements are not used.

Further, the amplification factor control part 23 is composed of the switches S1 through S4 that can electrically be opened and closed, and data of the electric signal Q to achieve the amplification factor after completion of the adjustment is stored in the memory 21, after which the data thus stored is used by being read out from the memory 21, whereby the temperature of the heating element 1 can be adjusted accurately by the use of a simple circuit configuration, and a thermal flow sensor with a high degree of precision and reliability can be achieved.

Embodiment 2

Figure 4:
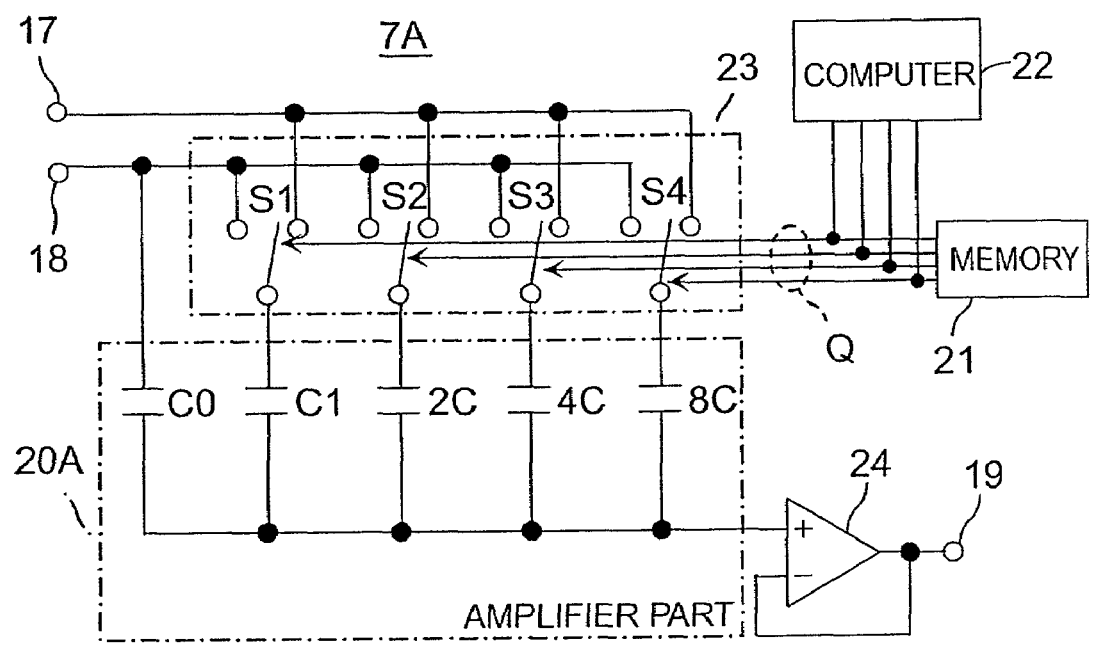
FIG. 4 is a circuit configuration diagram showing an amplifier section according to a second embodiment of the present invention.

Although in the above-mentioned first embodiment, the amplifier part 20 comprising the resistor array is used, an amplifier part 20A comprising a capacitor array may be used, as shown in FIG. 4.

FIG. 4 is a circuit configuration diagram that shows an amplifier section 7A according to a second embodiment of the present invention, wherein the like parts or components as those described above (see FIG. 2) are identified by the same symbols or by the same symbols with "A" affixed to their ends, while omitting a detailed explanation thereof. Also, the circuit configuration of the sensor as a whole is as shown in FIG. 1.

In FIG. 4, the amplifier part 20A is composed of a capacitor array comprising a plurality of capacitors C0, C1, 2C, 4C, 8C connected between input terminals 17, 18 and an output terminal 19 of the amplifier section 7A. The capacitor C0 has one end thereof connected to the input terminal 18 of the amplifier section 7A, and the capacitors C1, 2C, 4C, 8C have one ends thereof connected to the switches S1 through S4, respectively, in the amplification factor control part 23. In addition, the capacitors C0, C1, 2C, 4C, 8C have their common terminals connected to a non-inverting input terminal (+) of an operational amplifier 24, and hence connected to the output terminal 19 of the amplifier section 7A through the operational amplifier 24. The operational amplifier 24 has an output terminal thereof connected to its own inverting input terminal (−).

Here, note that the capacitance value of each of the capacitors C0, C1 is represented by "C"; the capacitance value of the capacitor 2C is represented by "2C"; the capacitance value of the capacitor 4C is represented by "4C"; and the capacitance value of the capacitor 8C is represented by "8C".

Figure 5:
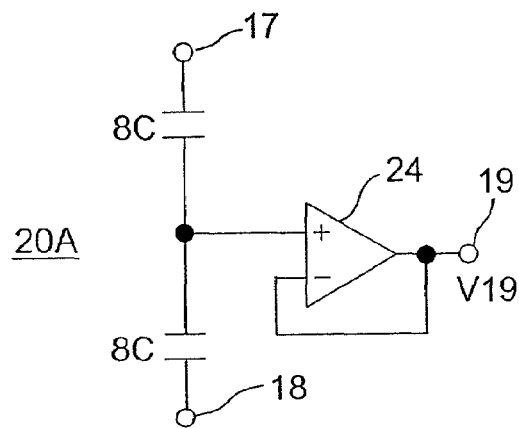
FIG. 5 is a circuit diagram showing one example of an equivalent circuit of the amplifier section shown in FIG. 4.
Figure 8:
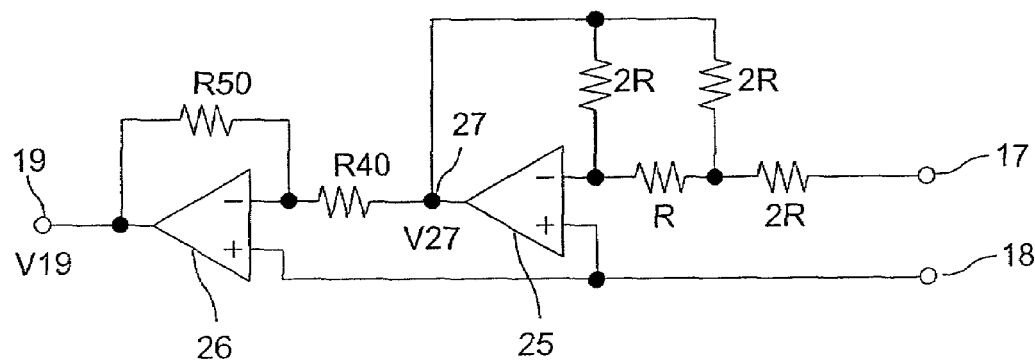
FIG. 8 is a circuit diagram showing one example of an equivalent circuit of the amplifier section shown in FIG. 7.

The amplifier part 20A and the amplification factor control part 23 shown in FIG. 4 have a configuration similar to that of a so-called charge distribution type DA converter. FIG. 5 is a circuit configuration diagram that illustrates one example of the amplifier part 20A, wherein there is illustrated an equivalent circuit in case where for example, the capacitors C1, 2C, 4C are connected to the input terminal 18 by means of the switches S1 through S3, respectively, in FIG. 4, with only the capacitor 8C being intermittently connected to the input terminal 17 by means of the switch S4. In FIG. 8, the capacitance value or the combined capacitance value is represented by "8C".

At this time, the output voltage V19 from the output terminal 19 is represented by the following expression (8).

$$V19 = \frac{8C}{16C}(V17 - V18) + V18 = \frac{1}{2}(V17 - V18) + V18 \qquad (8)$$

As can be seen from expression (8), the voltage division ratio x of the amplifier section 7A is decided by the ratio of the capacitance values (=8C/16C=1/2), and the absolute accuracy of the capacitance values is not required, so voltage division with high precision can be made as long as the relative accuracy thereof is kept.

Here, note that the general formula of the output voltage V19 becomes, as shown by the following expression (9), similar to the above-mentioned expression (2).

$$V19 = \frac{V17 - V18}{2^4} \times N + V18 \qquad (9)$$

Thus, the voltage division ratio x of the amplifier section 7A can be changed by the electric signal Q.

As described above, according to the second embodiment of the present invention, the temperature of the heating element 1 (see FIG. 1) can be adjusted only by sending the electric signal Q for adjustment from the computer 22, so the adjustment can be made in a short time by a simple arrangement or device.

In addition, the voltage division ratio x of the amplifier section 7A is decided by the ratio of the capacitance values, adjustment accuracy is not influenced by the absolute accuracy of the capacitance values, so adjustment with a high degree of precision can be made even if highly accurate and expensive elements are not used.

Embodiment 3

Figure 6:
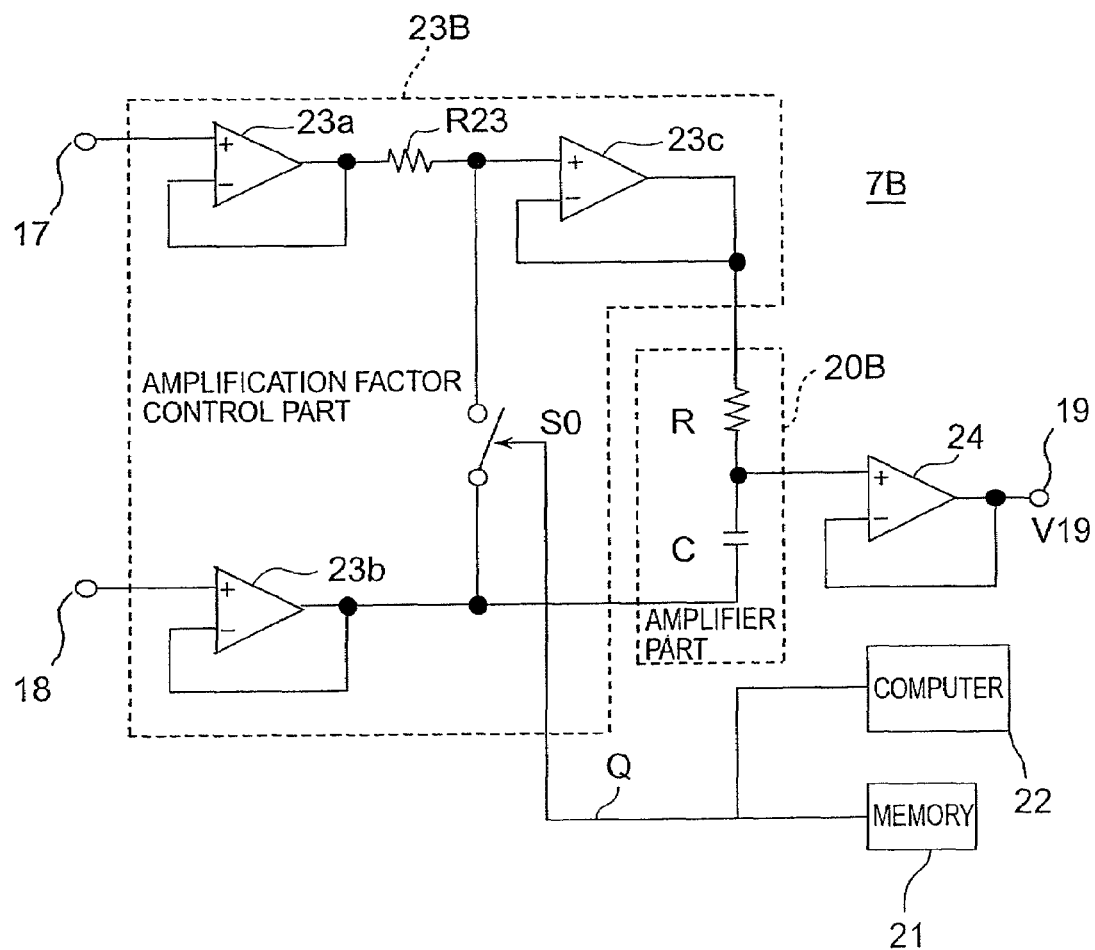
FIG. 6 is a circuit configuration diagram showing an amplifier section according to a third embodiment of the present invention.

Although in the above-mentioned first and second embodiments, the amplifier part 20 comprising the resistor array or the amplifier part 20A comprising the capacitor array is used, an amplifier part 20B comprising an integrator may be used, as shown in FIG. 6.

FIG. 6 is a circuit configuration diagram that shows an amplifier section 7B according to a third embodiment of the present invention, wherein the like parts or components as those described above (see FIGS. 2 and 4) are identified by the same symbols or by the same symbols with "B" affixed to their ends, while omitting a detailed explanation thereof. Also, the circuit configuration of the sensor as a whole is as shown in FIG. 1.

In FIG. 6, the amplifier part 20B is composed of an integrator in the form of a CR integration circuit. A junction between a resistor R and a capacitor C, which together constitute the amplifier part 20B, is connected to a non-inverting input terminal (+) of an operational amplifier 24. Here, note that the integrator is not limited to the CR integration circuit, but may be an other type of integrator. This is similar in respective embodiments to be described later.

An amplification factor control part 23B includes an operational amplifier 23a connected to an input terminal 17 of the amplifier section 7B, an operational amplifier 23b connected to an input terminal 18 of the amplifier section 7B, an operational amplifier 23c connected to an output terminal of the operational amplifier 23a through a resistor R23, and a switch S0 inserted between an output terminal of the operational amplifier 23b and an input terminal of the operational amplifier 23c. Each of the operational amplifiers 23a through 23c has an output terminal thereof connected to its own inverting input terminal (−).

The amplification factor control part 23B operates intermittently according to an electric signal Q (e.g., a clock signal of an arbitrary frequency) from the computer 22, and controls the amplification factor of the amplifier part 20B comprising the integrator by changing the duty ratio of the opened and closed times of the switch S0.

In FIG. 6, assuming that the opened time (the duty ratio) of the switch S0 is represented by tx and the closed time of the switch S0 is represented by (1−tx), an output voltage V19 of the amplifier section 7B is represented by the following expression (10).

$$V19 = -tx(V17 - V18) + V18 \quad (10)$$

As can be seen from expression (10), the voltage division ratio x of the amplifier section 7B is decided by the duty ratio tx of the opened and closed times of the switch S0.

Thus, the voltage division ratio x of the amplifier section 7B can be changed by the electric signal Q. Accordingly, neither circuit elements such as the resistor R and the capacitor C, which together constitute the amplifier part 20B, the resistor R23 which constitutes the amplification factor control part 23B, etc., nor the absolute accuracy of the clock frequency for the amplification factor control part 23B is required, so voltage division with a high degree of precision can be done as long as the relative accuracy of the opened and closed times of the switch S0 is kept.

As described above, according to the third embodiment of the present invention, the temperature of the heating element 1 can be adjusted only by sending the electric signal Q for adjustment from the computer 22, so the adjustment can be made in a short time by a simple arrangement or device.

In addition, the voltage division ratio x of the amplifier section 7B is decided by the ratio of the opened and closed times of the switch S0, and hence adjustment accuracy is not influenced by the accuracies of the resistors R, R23, the capacitor C and the clock frequency, so adjustment with a high degree of precision can be made.

Embodiment 4

Figure 7:
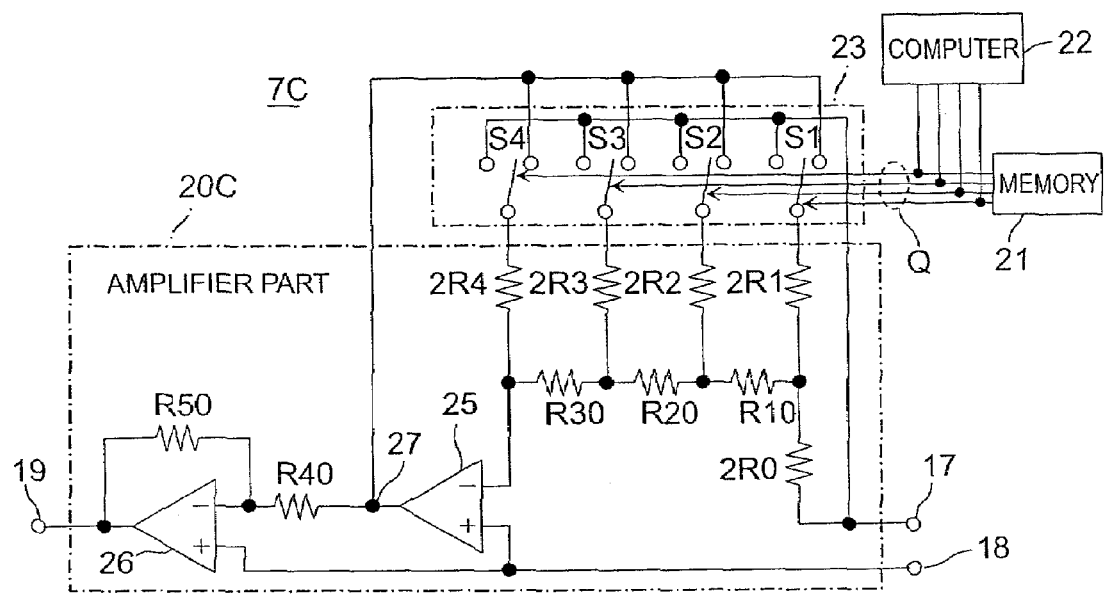
FIG. 7 is a circuit configuration diagram showing an amplifier section according to a fourth embodiment of the present invention.

Although in the above-mentioned first through third embodiments, reference has been made to the case where the amplification factor of the amplifier part 20, 20A or 20B is set to 1 or less, an amplifier part 20C may be constructed such that its amplification factor can be set to a value equal to or larger than 1, as shown in FIG. 7.

FIG. 7 is a circuit configuration diagram that shows an amplifier section 7C according to a fourth embodiment of the present invention, wherein the like parts or elements as those described above (see FIG. 2) are identified by the same symbols or by the same symbols with "C" affixed to their ends, while omitting a detailed explanation thereof. Also, the circuit configuration of the sensor as a whole is as shown in FIG. 1.

In FIG. 7, the amplifier part 20C includes, in addition to the above-mentioned resistor array (see FIG. 2), operational amplifiers 25, 26 and resistors R40, R50, and it is constructed in such a manner that its amplification factor can be set to not only a value equal to or less than 1 but also a value equal to or larger than 1.

In this case, the above-mentioned resistor array has one end connected to one input terminal 17 of the amplifier section 7C and an inverting input terminals (−) of the operational amplifier 25, and the other end connected to an output terminal 27 of the operational amplifier 25 through an amplification factor control part 23 (switches S1 through S4). Thus, the resistor array together with the operational amplifier 25 constitutes an inverting amplifier.

A resistor 2R0 has one end thereof connected to the input terminal 17, and resistors 2R1 through 2R4 have one ends thereof connected to the input terminal 17 or the output terminal 27 of the operational amplifier 25 through the switches S1 through S4, respectively.

The amplifier section 7C has another input terminal 18 connected to non-inverting input terminals (+) of the operational amplifiers 25, 26. The output terminal 27 of the operational amplifier 25 is connected to an inverting input terminal (−) of the operational amplifier 26 through the resistor R40, and the operational amplifier 26 has an output terminal connected to an output terminal 19 of the amplifier section 7C, and at the same time connected to its own inverting input terminal (−) through the resistor R50.

FIG. 8 is a circuit configuration diagram that illustrates one example of the amplifier part 20C, wherein there is shown an equivalent circuit in the case where for example, the resistors 2R1, 2R2 are connected to the input terminal 17 by means of the switches S1, S2, respectively, in FIG. 7, and the resistors 2R3, 2R4 are connected to the output terminal 27 of the operational amplifier 25 by means of the switches S3, S4, respectively. In FIG. 8, individual resistance values or combined resistance values are represented by "R" and "2R".

At this time, an output voltage V27 at the output terminal 27 of the operational amplifier 25 is represented by the following expression (11).

$$V27 = -\frac{1}{3}(V17 - V18) + V18 \quad (11)$$

In addition, from expression (11) above, an output voltage V19 of the amplifier section 7C is represented by the following expression (12).

$$V19 = -(V27 - V18) + V18 \quad (12)$$
$$= \frac{1}{3}(V17 - V18) + V18$$

Here, note that the general formula of the output voltage V19 becomes, as shown by the following expression (13).

$$V19 = \frac{2^4 - N}{N}(V17 - V18) + V18 \quad (13)$$

As can be seen from expression (13), the amplification factor of 1 or more can be obtained depending on the setting of the digital value N.

In the example of FIG. 8, the digital value N is 1100 in binary number, which is 12 in decimal number (N=1100 (binary number)=12 (decimal number)), so the output voltage V19 becomes, as shown by the following expression (14).

$$V19 = \frac{2^4 - 12}{12}(V17 - V18) + V18 = \frac{4}{12}(V17 - V18) + V18 \quad (14)$$

Accordingly, the above-mentioned expression (12) is obtained from expression (14) above.

Figure 9:
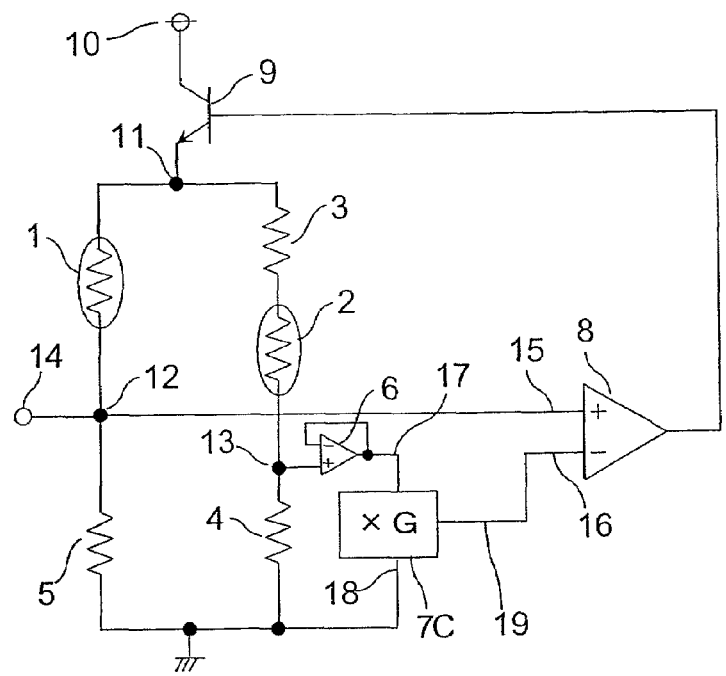
FIG. 9 is a circuit configuration diagram showing a thermal flow sensor according to the fourth embodiment of the present invention.

Here, as shown in FIG. 9 (corresponding to FIG. 1), assuming that the amplification factor of the amplifier section 7C is represented by G, the output voltage V19 from the output terminal 19 of the amplifier section 7C is represented by the following expression (15).

$$V19 = G(V17-V18)+V18 = G \cdot V17 = G \cdot V13 \quad (15)$$

In expression (15) above, a voltage V13 at a junction 13 is represented as shown in the above-mentioned expression (4), so the expression (15) becomes as shown in the following expression (16).

$$V19 = G \cdot \frac{R4}{R2 + R3 + R4} V11 \quad (16)$$

Here, an input voltage V15 to a non-inverting input terminal 15 of the operational amplifier 8 is represented as shown in the above-mentioned expression (5), and the input voltage V15 and the output voltage V19 of the amplifier section 7C become equal to each other, so the relation of the following expression (17) holds.

$$\frac{R5}{R1 + R5}V11 = G\frac{R4}{R2 + R3 + R4}V11 \quad (17)$$

Accordingly, the resistance value R1 of the heating element 1 is represented by the following expression (18).

$$R1 = \frac{\{R2 + R3 + (1 - G)R4\}R5}{G \cdot R4} \quad (18)$$

As can be seen from expression (18) above, by changing the amplification factor G of the amplifier section 7C, the resistance value, i.e., the temperature, of the heating element 1 can be adjusted. At this time, the amplification factor G is changed by the electric signal Q input to the amplification factor control part 23 (see FIG. 7).

As described above, according to the fourth embodiment of the present invention, the temperature of the heating element 1 can be adjusted only by sending the electric signal Q for adjustment from the computer 22, so the adjustment can be made in a short time by a simple arrangement or device.

In addition, the amplification factor G (corresponding to the voltage division ratio x) of the amplifier section 7C is decided by the ratio of the resistance values of the resistors that constitute the resistor array, and adjustment accuracy is not influenced by the absolute accuracies of the respective resistors, so adjustment with a high degree of precision can be made.

Embodiment 5

Figure 10:
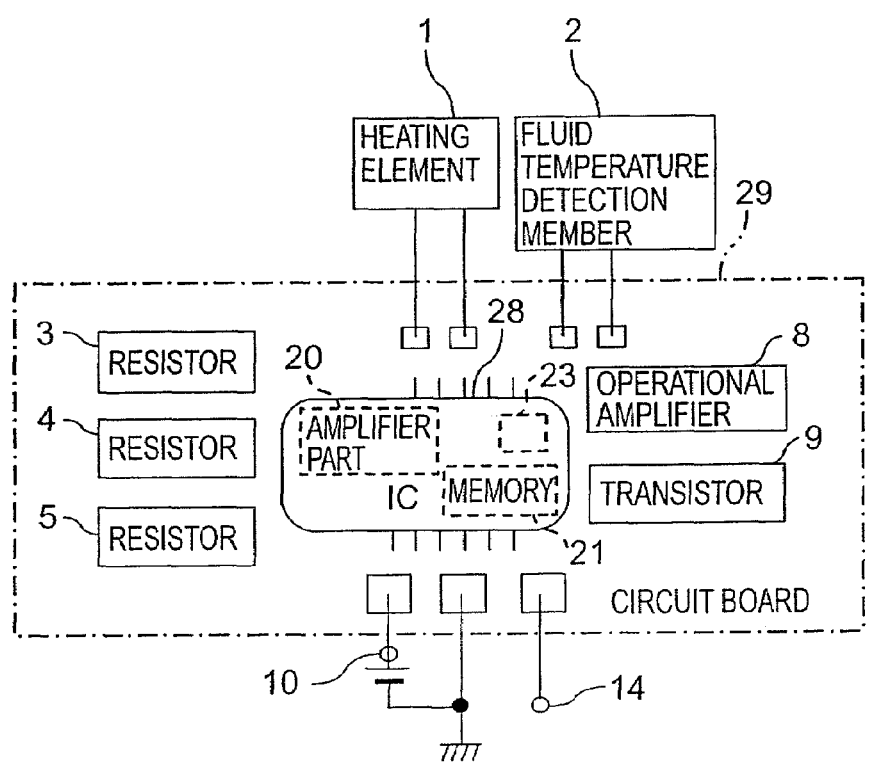
FIG. 10 is an explanatory view showing a mounting state of a thermal flow sensor according to a fifth embodiment of the present invention.

Although in the above-mentioned first through fourth embodiments, no particular reference has been made to the mounting structure of a thermal flow sensor, the individual circuit elements may be arranged on a circuit board 29 and electrically connected to one another, as shown in FIG. 10.

FIG. 10 is an explanatory view that shows the circuit mounting arrangement of a thermal flow sensor according to a fifth embodiment of the present invention, wherein the like parts or elements as those described above (see FIGS. 1 and 2) are identified by the same symbols while omitting a detailed description thereof.

In FIG. 10, an IC 28 is mounted on the circuit board 29, and an amplifier part 20, a memory 21 and an amplification factor control part 23 are integrated into the IC 28. In addition, resistors 3, 4, 5, an operational amplifier 8 and a transistor 9, which together constitute a bridge circuit, are mounted on the circuit board 29. A heating element 1 and a fluid temperature detection element 2 are connected to the IC 28 by wire bonding or the like. The amplifier part 20 integrated in the IC 28 is not limited to a resistor array (see FIG. 2), but may be applicable even if such a resistor array is replaced by any of a capacitor array (see FIG. 4), an integrator (see FIG. 6) or an inverting amplifier (see FIG. 7).

As described above, according to the fifth embodiment of the present invention, the amplifier part 20, the memory 21 and the amplification factor control part 23 are integrated into the IC 28, whereby the amplifier section 7 can be reduced in size.

Embodiment 6

Figure 11:
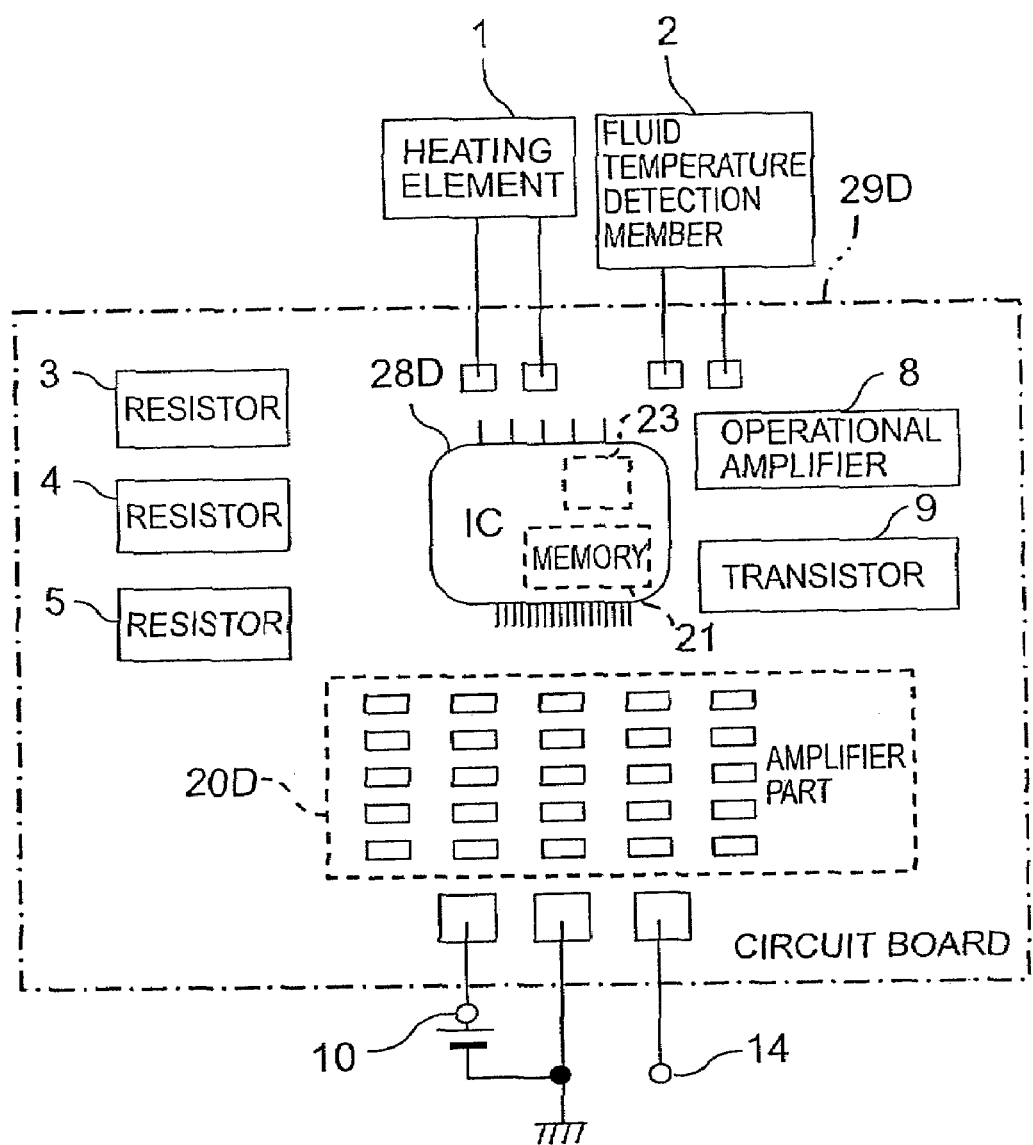
FIG. 11 is an explanatory view showing a mounting state of a thermal flow sensor according to a sixth embodiment of the present invention.

Although in the above-mentioned fifth embodiment, the amplifier part 20 is integrated into the IC 28 while giving priority to the size reduction of the circuit, a highly accurate and large-sized amplifier part 20D may be mounted on a circuit board 29D outside of an IC 28D, as shown in FIG. 11.

FIG. 11 is an explanatory view that shows the circuit mounting arrangement of a thermal flow sensor according to a sixth embodiment of the present invention, wherein the like parts or components as those described above (see FIG. 10) are identified by the same symbols or by the same symbols with "D" affixed to their ends, while omitting a detailed explanation thereof.

In FIG. 11, an IC 28D is mounted on the circuit board 29D, and a memory 21 and an amplification factor control part 23 are integrated into the IC 28D. In this case, the amplifier part 20D, being large in size and high in accuracy, is mounted on the circuit board 29D outside of the IC 28D.

The amplifier part 20D mounted on the circuit board 29D is not limited to the above-mentioned resistor array, but may be applicable even if such a resistor array is replaced by any of a capacitor array, an integrator or an inverting amplifier.

As described above, according to the sixth embodiment of the present invention, the amplifier part 20D is mounted on the circuit board 29D outside of the IC 28D, so the amplifier part 29D, which is higher in accuracy than the amplifier part 20 formed or built in the IC 28, can be used, thus making it possible to further improve adjustment accuracy.

Though such an operational effect is contrary or contradictory to that of the above-mentioned fifth embodiment, either the fifth embodiment or the sixth embodiment may be selected according to whether priority is given to accuracy improvement or size reduction.

Embodiment 7

Figure 12:
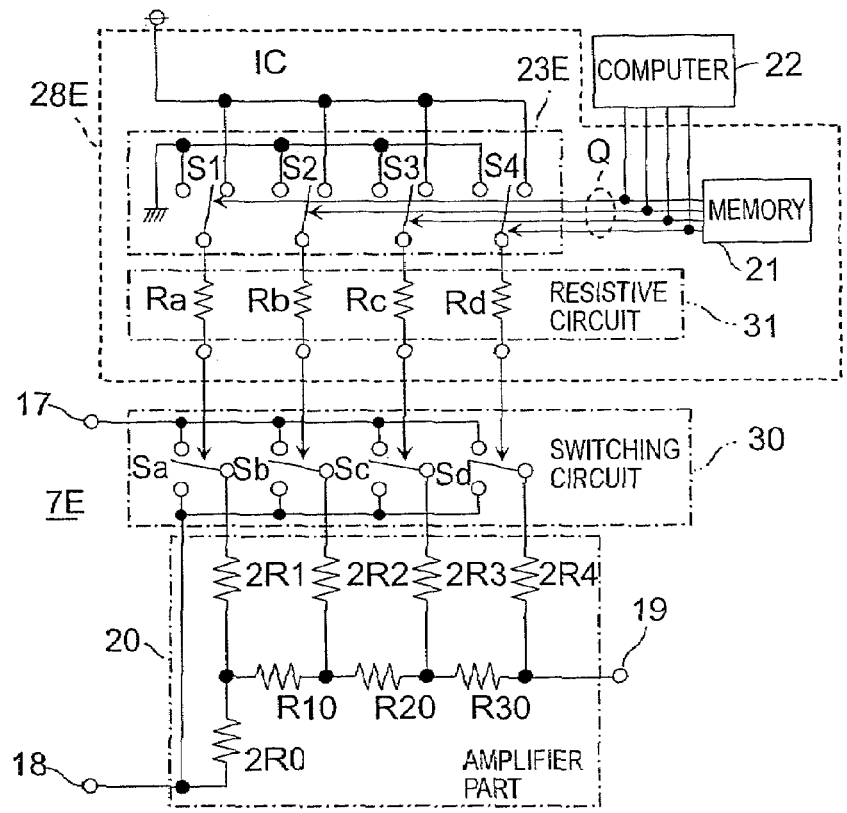
FIG. 12 is a circuit configuration diagram showing an amplifier section according to a seventh embodiment of the present invention.

Although in the above-mentioned sixth embodiment (see FIG. 11), no consideration has been given to the dielectric strength of switches that constitute the amplification factor control part 23 inside the IC 28D, in consideration of the case where a resistive circuit for overvoltage protection is needed (i.e., the dielectric strength of the switches in the IC 28D is low), a switching circuit 30, which constitutes a partial function of an amplification factor control part 23E, may be provided besides the amplification factor control part 23E (outside an IC 28E), for example as shown in FIG. 12.

FIG. 12 is a circuit configuration diagram that shows an amplifier section 7E according to a seventh embodiment of the present invention, wherein the like parts or components as those described above (see FIGS. 2 and 11) are identified by the same symbols or by the same symbols with "E" affixed to their ends, while omitting a detailed explanation thereof.

Here, note that the overall configuration of a thermal flow sensor according to the seventh embodiment of the present invention is as shown in FIG. 1, and the overall mounting arrangement thereof is as shown in FIG. 11.

In FIG. 12, a memory 21 and the amplification factor control part 23E are integrated into the IC 28E. On the other hand, on a circuit board outside the IC 28E, there are mounted an amplifier part 20, a switching circuit 30 comprising semiconductor switches Sa through Sd with high dielectric resistance, and a resistive circuit 31 comprising resistors Ra through Rd to protect the switches S1 through S4 in the amplification factor control part 23E from overvoltage.

Switch control signals output from one ends of the individual switches S1 through S4 in the amplification factor control part 23E are impressed to the corresponding semiconductor switches Sa through Sd, respectively, in the switching circuit 30 through the respective resistors Ra through Rd in the resistive circuit 31.

The switching circuit 30 constitutes a part of the amplification factor control part 23E, and is driven to control the amplification factor of the amplifier part 20 by the switch control signals input from the amplification factor control part 23E through the resistive circuit 31.

In general, in case where only the amplifier part 20 is formed on the circuit board outside of the IC 28E, it is necessary to connect between component parts from the amplification factor control part 23E in the IC 28E to the amplifier part 20 outside of the IC 28E by means of wiring. In addition, depending upon a method employed for manufacturing the IC 28E, there might be in some cases the need to connect the resistive circuit 31 to the switches S1 through S4 in the amplification factor control part 23E in order to protect them from overvoltage.

At this time, since the resistive circuit 31 is formed in the manufacturing process of the IC 28E, there might arise the problem of accuracy such as the variation, the temperature characteristic, etc., of the resistive circuit. Accordingly, as shown in FIG. 12, the switching circuit 30 comprising the semiconductor switches Sa through Sd excellent in dielectric strength is mounted on the circuit board outside of the IC 28E as a part of the function of the amplification factor control part 23E, so that the switching circuit 30 is driven to control the amplification factor by means of the switch control signals from the amplification factor control part 23E in the IC 28E.

As described above, according to the seventh embodiment of the present invention, even in the case of need of the resistive circuit 31 for overvoltage protection due to the problem of dielectric strength in the switches S1 through S4 in the amplification factor control part 23E in the IC 28E, it is possible to adjust the temperature of the heating element 1 (see FIG. 1) to a high degree of precision without receiving the influence of the variation or the temperature characteristic of the resistive circuit 31 for protection.

Embodiment 8

Figure 13:
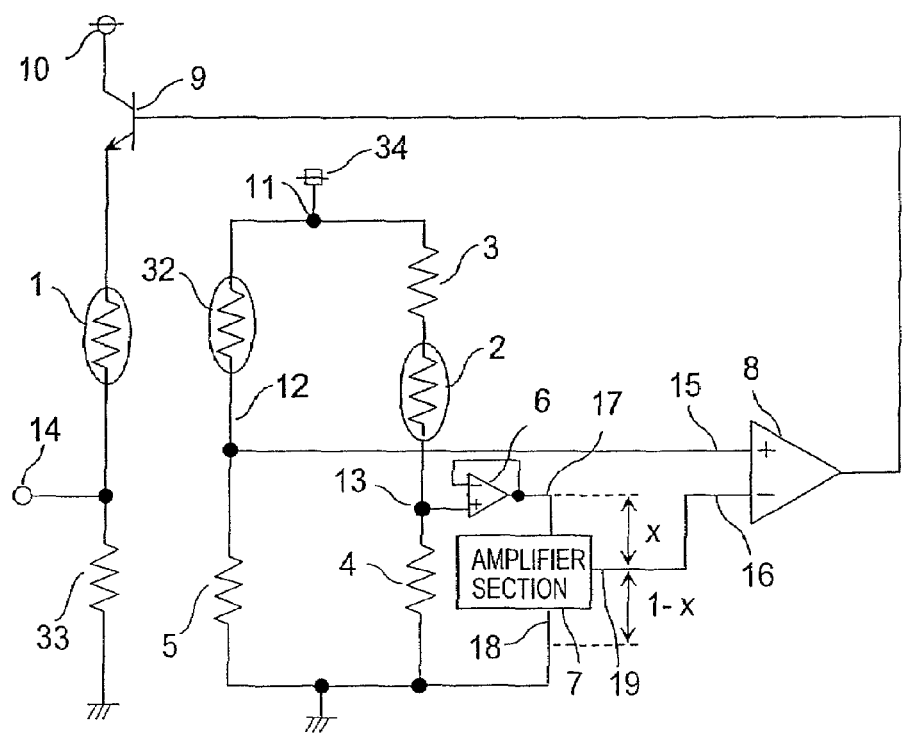
FIG. 13 is a circuit configuration diagram showing a thermal flow sensor according to an eighth embodiment of the present invention.

In the above-mentioned first through seventh embodiments, reference has been made to the case where the present invention is applied to a directly heated type thermal flow sensor in which a bridge circuit is composed of the heating element 1, the fluid temperature detection element 2 and the resistors 3 through 5, but the present invention may also be applied to an indirectly heated type flow sensor that includes, as shown in FIG. 13 for example, a temperature detection element 32 for detecting the temperature of a heating element 1, a resistor 33 connected in series to the heating element 1, and a constant voltage source 34 connected to a bridge circuit which comprises the temperature detection element 32, a fluid temperature detection element 2 and resistors 3 through 5.

FIG. 13 is a circuit configuration diagram showing a thermal flow sensor according to an eighth embodiment of the present invention, wherein the like parts or components as those described above (see FIG. 1) are identified by the same symbols while omitting a detailed description thereof.

In FIG. 13, a series circuit comprising a transistor 9, the heating element 1 and the resistor 33 is inserted between a power supply 10 and ground, and a junction between the heating element 1 and the resistor 33 is connected to an output terminal 14 of the thermal flow sensor.

In addition, a series circuit comprising the temperature detection element 32 and the resistor 5 and a series circuit comprising the resistor 3, the fluid temperature detection element 2 and the resistor 4 are inserted in parallel to each other between the constant voltage source 34 and ground.

A junction between the fluid temperature detection element 2 and the resistor 4 is connected to a non-inverting input terminal (+) of a buffer circuit 6, and a junction between the temperature detection element 32 and the resistor 5 is connected to a non-inverting input terminal 15 of an operational amplifier 8. The operational amplifier 8 has an output terminal thereof connected to a base terminal of the transistor 9.

As shown in FIG. 13, the bridge circuit is composed of the temperature detection element 32 of the heating element 1, the fluid temperature detection element 2 and the resistors 3 through 5, and it is connected to the constant voltage source 34. The temperature detection element 32 is formed in the extreme vicinity of the heating element 1, so that the temperature detected by the temperature detection element 32 comes to indicate a value substantially equal to an actual temperature of the heating element 1.

According to the circuit configuration of FIG. 13, the current supplied to the heating element 1 is controlled so that the bridge circuit keeps an equilibrium state, as a result of which the electric power supplied to the heating element 1 is controlled in such a manner that the temperature of the heating element 1 detected by the temperature detection element 32 coincides with a predetermined control temperature. Accordingly, in the indirectly heated type flow sensor, by amplifying a voltage across the opposite ends of the resistor 4 by means of the amplifier section 7, operational effects similar to those obtained in the above-mentioned individual first through seventh embodiments can be achieved. This is similar in respective embodiments to be described later.

As described above, according to the eighth embodiment of the present invention, the temperature of the heating element 1 can be adjusted only by sending an electric signal Q for adjustment (see FIG. 2) from an external computer to the amplifier section 7, so the adjustment can be made in a short time by a simple arrangement or device.

In addition, since the voltage division ratio x of the amplifier section 7 is decided by the ratio of the resistors in the amplifier section 7, adjustment accuracy is not influenced by the absolute accuracies of the resistors, and adjustment with a high degree of precision can be made.

Embodiment 9

Figure 14:
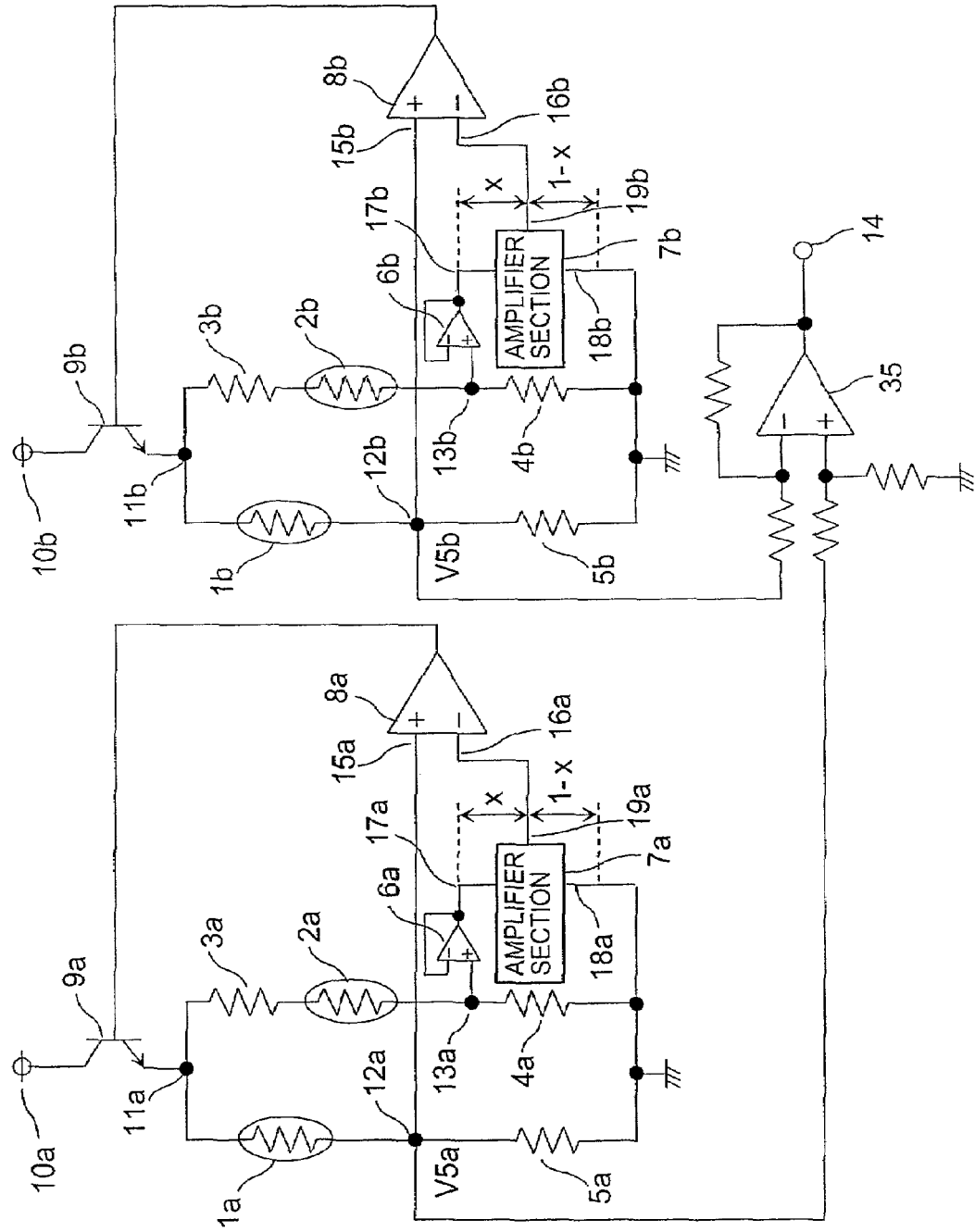
FIG. 14 is a circuit configuration diagram showing a thermal flow sensor according to a ninth embodiment of the present invention.

In the above-mentioned first through eighth embodiments, one bridge circuit corresponding to the one heating element 1 is used, but as shown in FIG. 14 for example, two bridge circuits corresponding to two heating element 1a, 1b may be arranged in parallel to each other, with an output terminal of each bridge circuit being connected to an output terminal 14 of a thermal flow sensor through a differential amplifier 35.

FIG. 14 is a circuit configuration diagram that shows a thermal flow sensor according to a ninth embodiment of the present invention, wherein the like parts as those described above (see FIG. 1) are identified by the same symbols or by the same symbols with "a" or "b" affixed to their ends, while omitting a detailed explanation thereof.

In FIG. 14, there is shown one example in a case where two bridge circuits are arranged in parallel to each other, each bridge circuit having the same configuration as that of the above-mentioned directly heated type thermal flow sensor (FIG. 1). In FIG. 14, the heating element 1a, a fluid temperature detection element 2a and resistors 3a through 5a together constitute a first bridge circuit, and a junction 12a between the heating element 1a and the resistor 5a, which is an output terminal of the first bridge circuit, is connected to a non-inverting input terminal (+) of the differential amplifier 35. Also, the heating element 1b, a fluid temperature detection element 2b and resistors 3b through 5b together constitute a second bridge circuit, and a junction 12b between the heating element 1b and the resistor 5b, which is an output terminal of the second bridge circuit, is connected to an inverting input terminal (−) of the differential amplifier 35.

The heating element 1a and the heating element 1b are formed in sequence and in parallel with respect to the flow of fluid, and in case of the fluid flow being downflow, the heating elements 1a, 1b are arranged in such a manner that the heating element 1a in the first bridge circuit is located at an upstream side of the heating element 1b in the second bridge circuit. When the fluid flow is downflow, the heating element 1a located at the upstream side is cooled more easily or effectively than the heating element 1b at the downstream side, so the current supplied to the heating element 1a of the first bridge circuit becomes larger than the current supplied to the heating element 1b of the second bridge circuit. In this case, a voltage at the junction 12a (voltage V5a across the opposite ends of the resistor 5a) output from the first bridge circuit becomes larger than a voltage at the junction 12b (voltage V5b across the opposite ends of the resistor 5b).

The differential amplifier 35 calculates a voltage deviation (=V5a−V5b) between the output voltage of the first bridge circuit (voltage V5a at the junction 12a) and the output voltage of the second bridge circuit (voltage V5b at the junction 12b), and outputs it from its output terminal 14 to the following circuit (not shown).

On the other hand, when the fluid flow is backflow, the output voltage of the first bridge circuit (voltage V5a at the junction 12a) becomes smaller than the output voltage of the second bridge circuit (voltage V5b at the junction 12b), so the state of backflow can be detected.

In addition, similarly as stated above, the amplifier sections 7a, 7b amplify the voltages across the opposite ends of the resistors 4a, 4b in the first and second bridge circuits, respectively, and impress them to the inverting input terminals 16a, 16b of the operational amplifiers 8a, 8b, respectively. As a result, the operational amplifiers 8a, 8b control the transistors 9a, 9b, respectively, whereby the currents supplied to the heating elements 1a, 1b are controlled in an appropriate manner.

Thus, in a so-called double heater type thermal flow sensor, too, by amplifying the voltages across the opposite ends of the resistors 4a, 4b in the individual bridge circuits by means of the amplifier sections 7a, 7b, respectively, and by controlling the transistors 9a, 9b through the individual operational amplifiers 8a, 8b, respectively, it is possible to achieve operational effects similar to the above-mentioned ones. This is similar in respective embodiments to be described later.

As described above, according to the ninth embodiment of the present invention, the temperatures of the heating elements 1a, 1b can be adjusted only by sending electric signals for adjustment from an external computer to the amplifier sections 7a, 7b, so the adjustment can be made in a short time by a simple arrangement or device. In addition, since the voltage division ratios x of the amplifier sections 7a, 7b are decided by the ratios of the resistors in the amplifier sections 7a, 7b, respectively, adjustment accuracy is not influenced by the absolute accuracies of the resistors, and adjustment with a high degree of precision can be made.

Embodiment 10

Figure 15:
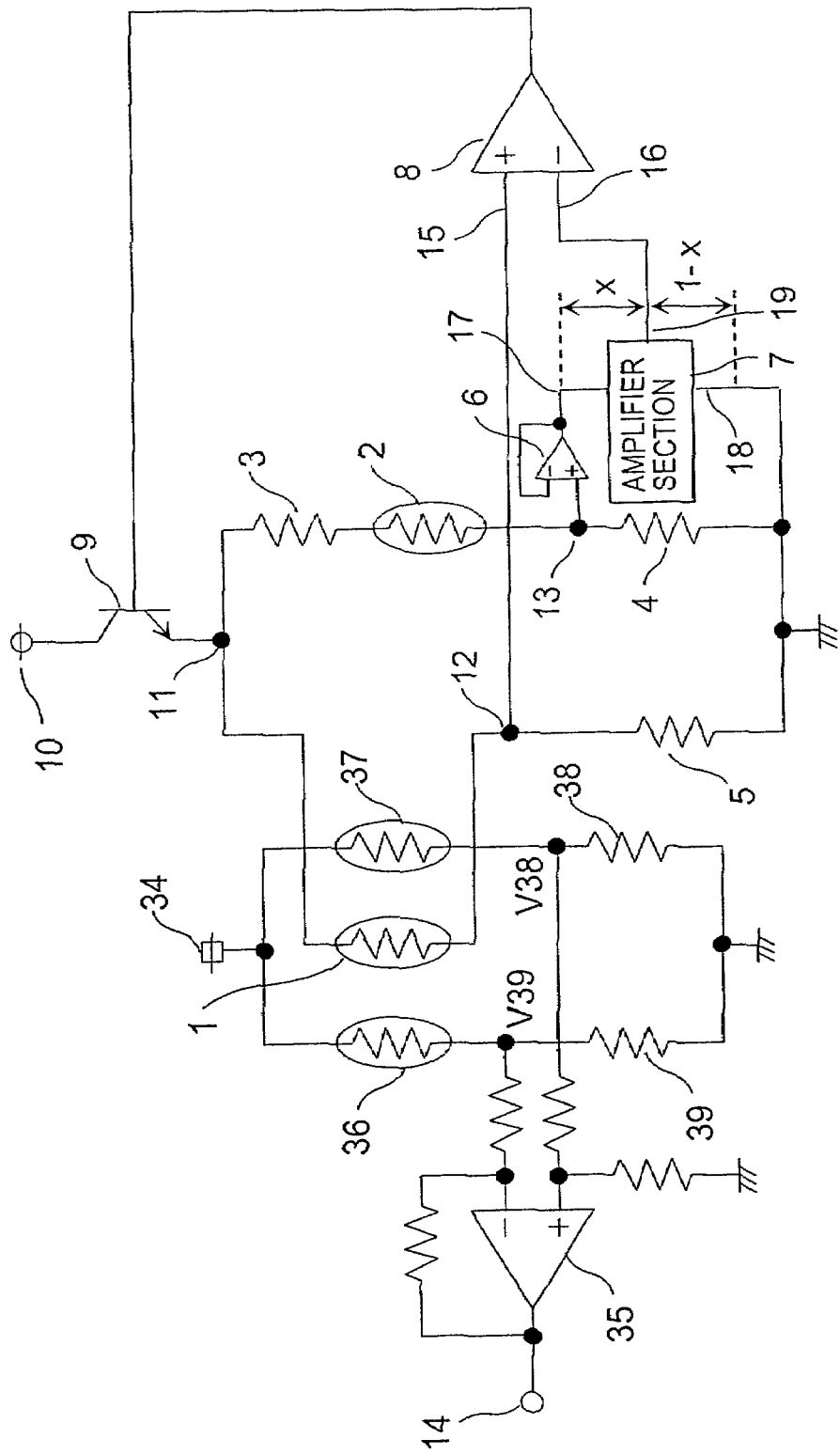
FIG. 15 is a circuit configuration diagram showing a thermal flow sensor according to a tenth embodiment of the present invention.

In the above-mentioned ninth embodiment, the two heating elements 1a, 1b are arranged at the upstream and downstream sides, respectively, with respect to the flow of fluid thereby to form the two bridge circuits corresponding to the heating elements 1*a*, 1*b*, respectively, but as shown in FIG. 15 for example, temperature detection elements 36, 37 may be arranged at the upstream and downstream sides of one heating element 1, and a second bridge circuit is composed of the temperature detection elements 36, 37 and resistors 38, 39, with two junctions of the second bridge circuit being connected to an output terminal 14 of a thermal flow sensor through a differential amplifier 35.

FIG. 15 is a circuit configuration diagram that shows a thermal flow sensor according to a tenth embodiment of the present invention, wherein the like parts or components as those described above (see FIGS. 1 and 14) are identified by the same symbols while omitting a detailed description thereof.

In FIG. 15, the temperature detection elements 36, 37 for detecting the temperature of the heating element 1, which is similar to the above-mentioned directly heated type thermal flow sensor (see FIG. 1), are formed or arranged at the upstream and downstream sides, respectively, of the heating element 1, whereby the second bridge circuit is composed of the temperature detection elements 36, 37 and the resistors 38, 39.

Also, in FIG. 15, a junction between the temperature detection element 36 and the resistor 39 is connected to an inverting input terminal (−) of the differential amplifier 35, and a junction between the temperature detection element 37 and the resistor 38 is connected to a non-inverting input terminal (+) of the differential amplifier 35.

In addition, when the fluid flow is downflow, the temperature detection element 36 is arranged to locate at the upstream side of the heating element 1, and the temperature detection element 37 is arranged to locate at the downstream side of the heating element 1. In this case, the temperature detection element 36 located at the upstream side is cooled more easily or effectively than the temperature detection element 37 located at the downstream side, so the temperature of the temperature detection element 36 becomes lower than the temperature of the temperature detection element 37.

In the second bridge circuit, the temperature detected by the temperature detection element 36 is output as a voltage V39 across the opposite ends of the resistor 39, and the temperature detected by the temperature detection element 37 is output as a voltage V38 across the opposite ends of the resistor 38.

The differential amplifier 35 calculates a voltage deviation (=V38−V39) between the voltage V38 across the opposite ends of the resistor 38 and the voltage V39 across the opposite ends of the resistor 39, and outputs it from its output terminal 14 to the following circuit. The output voltage of the differential amplifier 35 indicates a temperature deviation between the temperature detected by the temperature detection element 36 and the temperature detected by the temperature detection element 37.

On the other hand, when the fluid flow is backflow, the temperature detected by the temperature detection element 36 becomes higher than the temperature detected by the temperature detection element 37, so the state of backflow can be detected.

In addition, similarly as stated above, the amplifier section 7 amplifies the voltage across the opposite ends of the resistor 4 in the first bridge circuit, and impress it to the inverting input terminal 16 of the operational amplifier 8, whereby the operational amplifier 8 controls the transistor 9 thereby to adjust the current supplied to the heating element 1 in an appropriate manner.

Thus, in a so-called temperature difference detection type thermal flow sensor, too, operational effects similar to the above-mentioned ones can be obtained by amplifying the voltage across the opposite ends of the resistor 4 in the first bridge circuit by means of the amplifier section 7. This is similar in respective embodiments to be described later.

As described above, according to the tenth embodiment of the present invention, the temperature of the heating element 1 can be adjusted only by sending an electric signal Q for adjustment (see FIG. 2) from an external computer, so the adjustment can be made in a short time by a simple arrangement or device. In addition, since the voltage division ratio x of the amplifier section 7 is decided by the ratio of the resistors in the amplifier section 7, adjustment accuracy is not influenced by the absolute accuracies of the resistors, and adjustment with a high degree of precision can be made.

Embodiment 11

Figure 16:
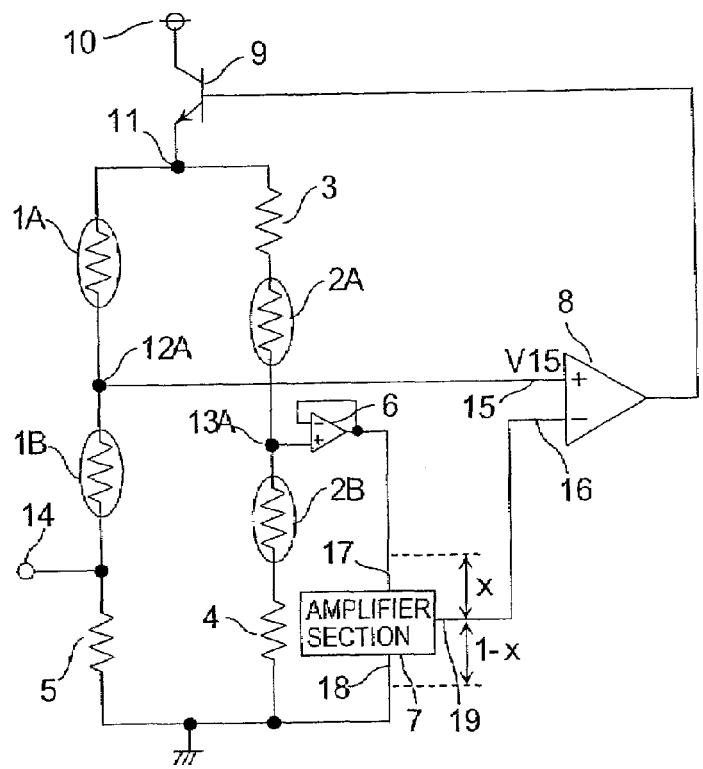
FIG. 16 is a circuit configuration diagram showing a thermal flow sensor according to an eleventh embodiment of the present invention.

Although in the above-mentioned first through tenth embodiments, only one heating element is arranged in one bridge circuit, two heating elements 1A, 1B may be arranged in series with each other in one bridge circuit, and similarly, two fluid temperature detection elements 2A, 2B may be arranged in series with each other, as shown in FIG. 16 for example.

FIG. 16 is a circuit configuration diagram that shows a thermal flow sensor according to an eleventh embodiment of the present invention, wherein the like parts or components as those described above are identified by the same symbols or by the same symbols with "A" or "B" affixed to their ends, while omitting a detailed explanation thereof.

In the bridge circuit shown in FIG. 16, a junction 13A between the fluid temperature detection elements 2A, 2B connected in series with each other is connected to an input terminal 17 of an amplifier section 7 through a buffer circuit 6. Also, a junction 12A between the heating elements 1A, 1B connected in series with each other is connected to a non-inverting input terminal 15 of an operational amplifier 8. The fluid temperature detection element 2B has one end thereof at a ground side connected to one end of a resistor 4, which has one terminal at a ground side connected to an input terminal 18 of the amplifier section 7. As a result, the amplifier section 7 amplifies a voltage across the opposite ends of a series circuit comprising the fluid temperature detection element 2B and the resistor 4.

Similarly as stated above, when the amplifier section 7 divides an input voltage into a ratio of "x:1−x", and outputs the thus divided voltage, an input voltage V16 to an inverting input terminal 16 of the operational amplifier 8 is represented by using a voltage V13*a* at the junction 13A between the fluid temperature detection elements 2A, 2B, as shown by the following expression (19).

$$V16 = (1-x)V13a \quad (19)$$

In addition, the voltage V13*a* is represented by using a voltage V11 at a junction 11 between the heating element 1A and a resistor 3, as shown by the following expression (20).

$$V13a = \frac{R2b + R4}{R2a + R2b + R3 + R4} V11 \quad (20)$$

where R2*a* and R2*b* are the individual resistance values of the fluid temperature detection element 2A, 2B, respectively.

On the other hand, an input voltage V15 to the non-inverting input terminal 15 of the operational amplifier 8 is represented by the following expression (21).

$$V15 = \frac{R1b + R5}{R1a + R1b + R5} V11 \qquad (21)$$

where R1*a* and R1*b* are the individual resistance values of the heating element 1A, 1B, respectively.

Here, if the input terminals 15, 16 of the operational amplifier 8 are virtually short-circuited with each other, the input voltages V15, V16 to the input terminals 15, 16 become equal to each other (V15=V16), and hence the above expression (21) is represented by the following expression (22).

$$\frac{R1b + R5}{R1a + R1b + R5} V11 = (1 - x) \frac{R2b + R4}{R2a + R2b + R3 + R4} V11 \qquad (22)$$

Accordingly, the resistance value R1*a* of the heating element 1A is represented by the following expression (23) in association with the resistance value R1*b* of the heating element 1B.

$$R1a = \frac{\{R3 + R2a + x(R2b + R4)\}(R1b + R5)}{(1 - x)(R2b + R4)} \qquad (23)$$

As can be seen from expression (23), by changing the voltage division ratio x of the amplifier section 7, the resistance value, i.e., the temperature, of the heating element 1A can be adjusted. Also, since the resistance value R1*b* of the heating element 1B exists at the right-hand side of expression (23), the temperature of the heating element 1A is varied by the flow rate of fluid.

Thus, the thermal flow sensor using the serially connected heating elements 1A, 1B and the serially connected fluid temperature detection elements 2A, 2B, though well-known (see, for example, Japanese patent application laid-open No. 2002-5717), is a system that can achieve an advantageous effect of improving the temperature characteristic of the sensor. In case where the present invention is applied to such a kind of thermal flow sensor, operational effects similar to the above-mentioned ones can be obtained by adjusting the amplification factor by means of the amplifier section 7. This is similar in respective embodiments to be described later.

As described above, according to the eleventh embodiment of the present invention, the temperatures of the heating elements 1A, 1B can be adjusted only by sending an electric signal Q for adjustment (see FIG. 2) from an external computer, so the adjustment can be made in a short time by a simple arrangement or device.

In addition, since the voltage division ratio x of the amplifier section 7 is decided by the ratio of the resistance values of resistors, adjustment accuracy is not influenced by the absolute accuracies of the resistors, and adjustment with a high degree of precision can be made.

Embodiment 12

Figure 17:
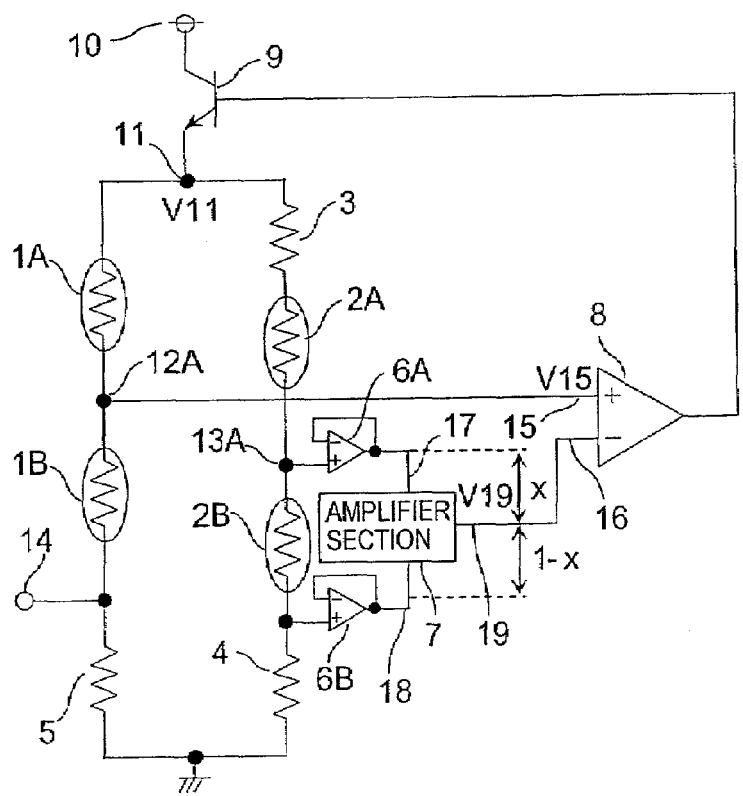
FIG. 17 is a circuit configuration diagram showing a thermal flow sensor according to a twelfth embodiment of the present invention.

Although in the above-mentioned eleventh embodiment, a voltage across the opposite ends of the series circuit of the fluid temperature detection element 2B and the resistor 4 is impressed to the amplifier section 7, a voltage across the opposite ends of the fluid temperature detection element 2B may instead be impressed to the amplifier section 7, as shown in FIG. 17, for example.

FIG. 17 is a circuit configuration diagram that shows a thermal flow sensor according to a twelfth embodiment of the present invention, wherein the like parts or components as those described above (see FIG. 16) are identified by the same symbols or by the same symbols with "A" or "B" affixed to their ends, while omitting a detailed explanation thereof.

In FIG. 17, the voltage across the opposite ends of the fluid temperature detection element 2B is impressed to the amplifier section 7 through buffer circuits 6A, 6B connected to the individual ends thereof, respectively.

Here, similarly as stated above, when the amplifier section 7 divides an input voltage into a ratio of "x:1−x", and outputs the thus divided voltage, an output voltage V19 of the amplifier section 7 is represented by the following expression (24).

$$V19 = \frac{(1 - x)R2b + R4}{R2a + R2b + R3 + R4} V11 \qquad (24)$$

The output voltage V19 of the amplifier section 7 is impressed to an inverting input terminal 16 of an operational amplifier 8. On the other hand, a voltage V15 (voltage at a junction 12A between heating elements 1A, 1B), being represented by the above-mentioned expression (21), is impressed to a non-inverting input terminal 15 of the operational amplifier 8.

Accordingly, a resistance value R1*a* of the heating element 1A is represented by the following expression (25) in association with a resistance value R1*b* of the heating element 1B.

$$R1a = \frac{(R3 + R2a + xR2b)(R5 + R1b)}{(1 - x)R2b + R4} \qquad (25)$$

As can be seen from expression (25), by changing the voltage division ratio x of the amplifier section 7, the resistance value, i.e., the temperature, of the heating element 1A can be adjusted.

Thus, operational effects similar to the above-mentioned ones are obtained even with the circuit configuration that amplifies the voltage across the opposite ends of the fluid temperature detection element 2B. This is similar in respective embodiments to be described later.

As described above, according to the twelfth embodiment of the present invention, the temperatures of the heating elements 1A, 1B can be adjusted only by sending an electric signal Q for adjustment (see FIG. 2) from an external computer, so the adjustment can be made in a short time by a simple arrangement or device.

In addition, since the voltage division ratio x of the amplifier section 7 is decided by the ratio of the resistance values of resistors, adjustment accuracy is not influenced by the absolute accuracies of the resistors, and adjustment with a high degree of precision can be made.

Embodiment 13

Figure 18:
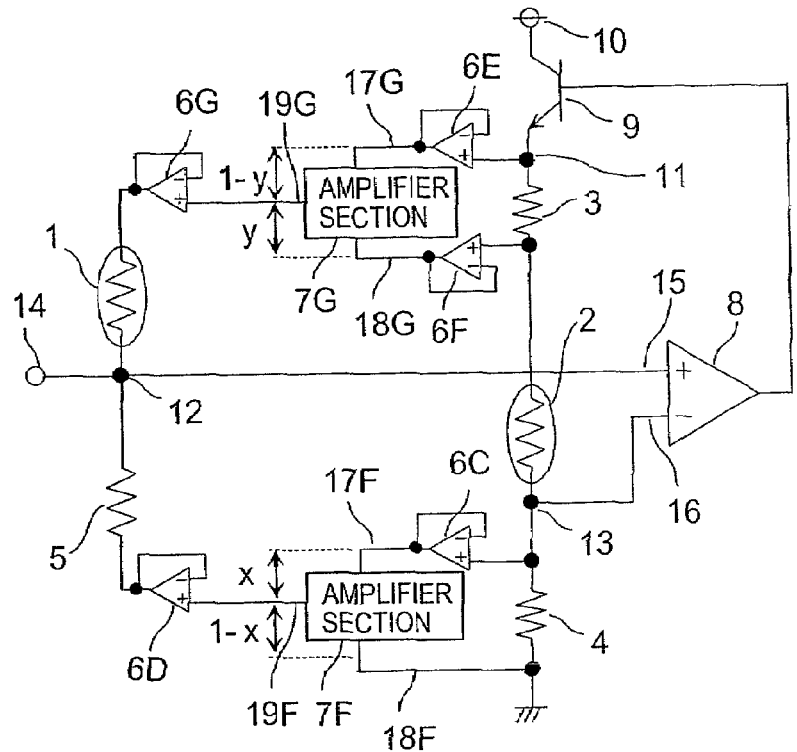
FIG. 18 is a circuit configuration diagram showing a thermal flow sensor according to a thirteenth embodiment of the present invention.

Although in the above-mentioned first through twelfth embodiments, one amplifier section is used for one bridge circuit, two amplifier sections 7F, 7G may be used for one bridge circuit, as shown in FIG. 18 for example.

FIG. 18 is a circuit configuration diagram that shows a thermal flow sensor according to a thirteenth embodiment of the present invention, wherein the like parts or components as those described above (see FIG. 1) are identified by the same symbols or by the same symbols with "C" through "G" affixed to their ends, while omitting a detailed explanation thereof.

In FIG. 18, two amplifier sections 7F, 7G are arranged for the bridge circuit. The amplifier section 7F constitutes a DA converter similar to the above-mentioned one (see FIG. 2), and includes, for example, an amplifier part 20 in the form of a resistor array, and an amplification factor control part 23 in the form of switches that can be electrically controlled. Also, the amplifier section 7G is constructed similar to the amplifier section 7F.

A junction between a fluid temperature detection element 2 and a resistor 4 is connected to an input terminal 17F of the amplifier section 7F through a buffer circuit 6C, and the resistor 4 has a terminal at a ground side connected to an input terminal 18F of the amplifier section 7F. The amplifier section 7F has an output terminal 19F connected to one end (an end that is not connected to the heating element 1) of a resistor 5 through a buffer circuit 6D. A voltage across the opposite ends of the resistor 4 is impressed to the amplifier section 7F through the buffer circuit 6C, and the amplifier section 7F divides an input voltage (amplifies it at a ratio of 1 or less) and outputs the thus divided voltage.

On the other hand, a junction 11 between a transistor 9 and a resistor 3 is connected to an input terminal 17G of the amplifier section 7G through a buffer circuit 6E. A junction between the resistor 3 and the fluid temperature detection element 2 is connected to an input terminal 18G of the amplifier section 7G through a buffer circuit 6F, and the amplifier section 7G has an output terminal 19G connected to one end of the heating element 1 (an end that is not connected to the resistor 5) through a buffer circuit 6G. A voltage across the opposite ends of the resistor 3 is impressed to the amplifier section 7G through the buffer circuits 6E, 6F, and the amplifier section 7G divides the input voltage in an appropriate manner and outputs it.

As stated above, the fluid temperature detection element 2 is formed or arranged at a location at which it does not receive the influence of heat from the heating element 1, and constitutes a bridge circuit together with the heating element 1 and the resistors 3, 4, 5.

A voltage at a junction 13 between the fluid temperature detection element 2 and the resistor 4 is input to an inverting input terminal 16 of an operational amplifier 8, and a voltage at a junction 12 between the heating element 1 and the resistor 5 is impressed to a non-inverting input terminal 15 of the operational amplifier 8. The operational amplifier 8 has its output terminal connected to a base terminal of the transistor 9, which has an emitter connected to one end of the resistor 3.

In FIG. 18, when the amplifier section 7F divides the input voltage into a ratio of "x:1−x" and outputs the thus divided voltage, and when the amplifier section 7G divides the input voltage into a ratio of "1−y:y" and outputs the thus divided voltage, an output voltage V19f of the amplifier 7F at a ground side is represented by using the individual resistance values R2 through R4 of the resistors 2 through 4 and the voltage V11 at the junction 11, as shown by the following expression (26).

$$V19f = (1-x)\frac{R4}{R2 + R3 + R4}V11 \tag{26}$$

Also, an output voltage V19g of the amplifier section 7G at the power supply 10 side is represented by the following expression (27).

$$V19g = \frac{R2 + yR3 + R4}{R2 + R3 + R4}V11 \tag{27}$$

Accordingly, an input voltage V15 to the non-inverting input terminal 15 of the operational amplifier 8 is represented by the following expression (28).

$$\begin{aligned}V15 &= V19f + \frac{R5}{R1+R5}(V19g - V19f) \\ &= \frac{R1}{R1+R5}V19f + \frac{R5}{R1+R5}V19g \\ &= (1-x)\frac{R1}{R1+R5}\frac{R4}{R2+R3+R4}V11 + \\ &\quad \frac{R5}{R1+R5}\frac{R2+yR3+R4}{R2+R3+R4}V11\end{aligned} \tag{28}$$

In addition, an input voltage V16 to the inverting input terminal 16 of the operational amplifier 8 is represented by the following expression (29).

$$V16 = \frac{R4}{R3 + R3 + R4}V11 \tag{29}$$

Here, from V15=V16, a resistance value R1 of the heating element 1 is represented, as shown by the following expression (30).

$$R1 = \frac{(R2 + yR3)R5}{xR4} \tag{30}$$

On the other hand, the resistance value R2 of the fluid temperature detection element 2 is changed in accordance with the temperature thereof, so it is replaced as shown by the following expression (31).

$$R2 = R20(1+\alpha_2 T_2) \tag{31}$$

where R20 is the resistance value of the fluid temperature detection element 2 at a temperature of 0° C.; α2 is the temperature coefficient of resistance of the fluid temperature detection element 2; and T2 is the temperature of the fluid temperature detection element 2.

When expression (31) is assigned to expression (30) and the result is rearranged, the resistance value R1 of the heating element 1 is represented by the following expression (32).

$$R1 = \frac{(R20 + yR3)R5}{xR4}\left(1 + \frac{R20}{R20 + yR3}\alpha_2 T_2\right) \tag{32}$$

In expression (32) above, the term R20/(R20+yR3)×α2 in the right-hand side parentheses represents the temperature coefficient of the resistance value R1, which can be adjusted by a voltage division ratio y. Also, the resistance value R1 can be adjusted by the voltage division ratio x. Accordingly, as can be seen from expression (32), the resistance value R1 and the temperature coefficient can be adjusted independently from each other.

In the thermal flow sensor, it is necessary to adjust the resistance value R1 and the temperature coefficient of the heating element 1 independently from each other for adjustment of the temperature characteristic of the sensor, but according to the thirteenth embodiment, the present invention can be applied to such a case.

As described above, according to the thirteenth embodiment of the present invention, the temperature of the heating element 1 can be adjusted only by sending an electric signal for adjustment from an external computer, so the adjustment can be made in a short time by a simple arrangement or device.

In addition, since the voltage division ratio x of the amplifier section 7 is decided by the ratio of the resistance values of resistors, adjustment accuracy is not influenced by the absolute accuracies of the resistors, and adjustment with a high degree of precision can be made.

Further, since the resistance value R1 and the temperature coefficient of the heating element 1 can be adjusted independently from each other, the temperature characteristic of the sensor can be adjusted by using a simple device and circuit.

Embodiment 14

Figure 19:
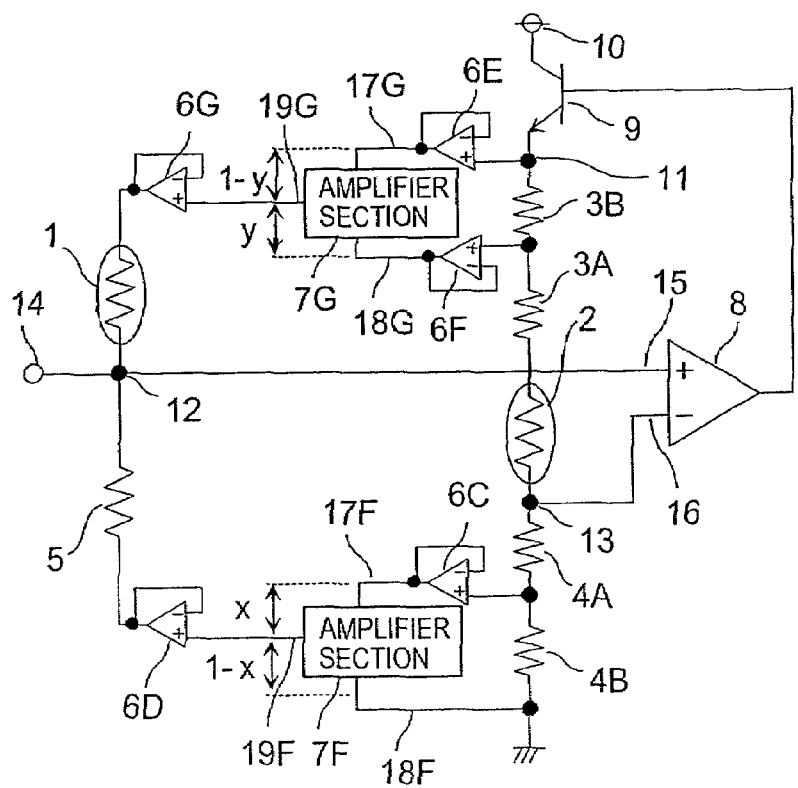
FIG. 19 is a circuit configuration diagram showing a thermal flow sensor according to the fourteenth embodiment of the present invention.

Although in the above-mentioned thirteenth embodiment, each one of the resistors 3, 4 is connected in series to the opposite ends, respectively, of the fluid temperature detection element 2 (i.e., one resistor for each end of the element), each two of resistors 3A, 3B and 4A, 4B may be connected to the opposite ends, respectively, of the fluid temperature detection element 2, as shown in FIG. 19 for example.

FIG. 19 is a circuit configuration diagram that shows a thermal flow sensor according to a fourteenth embodiment of the present invention, wherein the like parts or components as those described above (see FIG. 18) are identified by the same symbols or by the same symbols with "A" or "B" affixed to their ends, while omitting a detailed explanation thereof.

In FIG. 19, each two of resistors 3A, 3B, and 4A, 4B are connected to the opposite ends, respectively, of the fluid temperature detection element 2. Specifically, in this case, the above-mentioned resistor 3 is divided into the resistor 3A and the resistor 3B, and the above-mentioned resistor 4 is divided into the resistor 4A and the resistor 4B. A voltage across the opposite ends of the resistor 3B is divided into a ratio of "1−w:w" by means of an amplifier section 7G, and a voltage across the opposite ends of the resistor 4B is divided into a ratio of "z:1−z" by means of an amplifier section 7F.

Accordingly, the resistance value R1 of the heating element 1 is represented by the following expression (33).

$$R1 = \frac{(R2 + R3a + wR3b)R5}{R4a + zR4b} \quad (33)$$

When expression (33) above is compared with the aforementioned expression (30), the following expressions (34), (35) hold.

$$xR4 = R4a + zR4b \quad (34)$$

$$yR3 = R3a + wR3b \quad (35)$$

The above expressions (34), (35) are formulated in such a manner that adjustment terms (xR4, yR3) of the above-mentioned thirteenth embodiment are divided into fixed components (R4a, R3a) and variable components (zR4b, wR3b), respectively.

The resistance values R3a, R4a of the individual resistors 3A, 3B take minimum values of yR3, xR4, respectively, and the resistance values R3b, R4b of the respective resistors 3B, 4B take the values of the change widths of yR3, xR4, respectively. As a result, only the adjustment components (corresponding to the resistor 3B, 4B) of the aforementioned resistors R3, R4 can be voltage divided.

As described above, according to the fourteenth embodiment of the present invention, the temperature of the heating element 1 can be adjusted only by sending an electric signal for adjustment from an external computer, so the adjustment can be made in a short time by a simple arrangement or device.

In addition, since the voltage division ratios w, z are decided by the ratios of the resistance values of resistors, adjustment accuracy is not influenced by the absolute accuracies of the resistors, and adjustment with a high degree of precision can be made.

Moreover, since the resistance value and the temperature coefficient of the heating element 1 can be adjusted independently from each other, the temperature characteristic of the sensor can be adjusted by using a simple device and circuit.

Further, since only the adjustment component is voltage divided and adjusted, high adjustment accuracy can be obtained even with low resolution.

Embodiment 15

Figure 20:
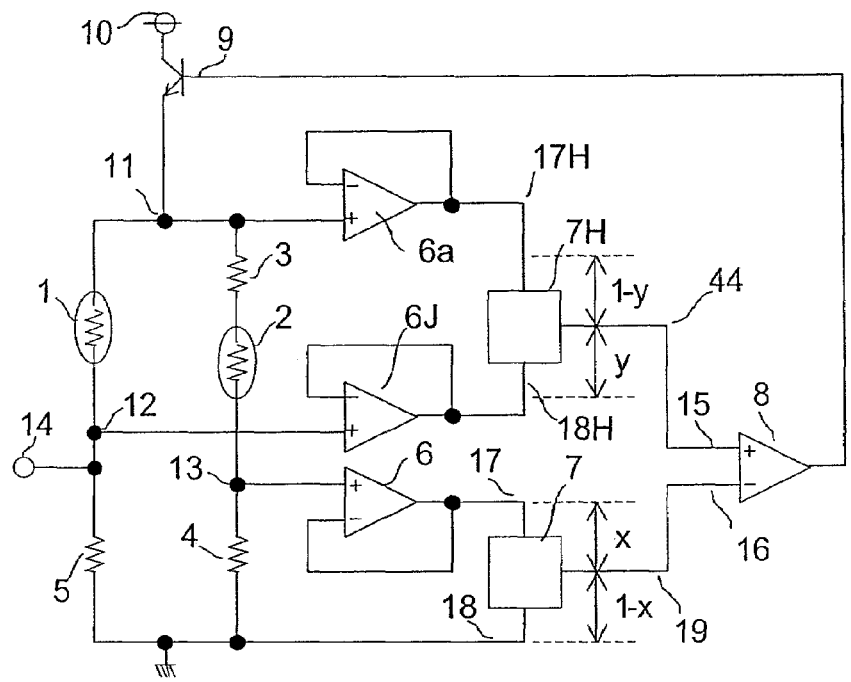
FIG. 20 is a circuit configuration diagram showing a thermal flow sensor according to a fifteenth embodiment of the present invention.

Although in the above-mentioned thirteenth and fourteenth embodiments, two amplifier sections 7F, 7G are arranged in a bridge circuit, two amplifier sections 7, 7H may instead be arranged outside of a bridge circuit, as shown in FIG. 20 for example.

FIG. 20 is a circuit configuration diagram that shows a thermal flow sensor according to a fifteenth embodiment of the present invention, wherein the like parts or components as those described above (see FIG. 1) are identified by the same symbols or by the same symbols with "H" through "J" affixed to their ends, while omitting a detailed explanation thereof.

In FIG. 20, the bridge circuit includes, similar to the above-mentioned first embodiment, a heating element 1, a fluid temperature detection element 2 that is formed or arranged at a location free from the influence of heat from the heating element 1, and a plurality of resistors 3, 4, 5. A voltage across the opposite ends of the resistor 4 is impressed to the amplifier section 7 through a buffer circuit 6. The amplifier section 7 has an output terminal 19 connected to an inverting input terminal 16 of an operational amplifier 8. The amplifier section 7 constitutes a DA converter similar to the above-mentioned one (FIG. 2), and includes an amplifier part 20 in the form of a resistor array, and an amplification factor control part 23 in the form of switches that can be electrically controlled. The amplifier section 7 serves to divide an input voltage (amplify it at a ratio of 1 or less) and output the thus divided voltage.

A voltage across the opposite ends of the heating element 1 is impressed to the amplifier section 7H through buffer circuits 6H, 6J. The amplifier section 7H has a configuration similar to the amplifier section 7, and serves to divide and output an input voltage. The amplifier section 7H has an output terminal 19H connected to a non-inverting input terminal 15 of the operational amplifier 8. The operational amplifier 8 has its output terminal connected to a base terminal of a transistor 9, which has an emitter connected to a junction 11 between the heating element 1 and the resistor 3.

As shown in FIG. 20, when the amplifier section 7 divides the input voltage into a ratio of "x:1−x" and outputs the thus divided voltage, and when the amplifier section 7H divides the input voltage into a ratio of "1−y:y" and outputs the thus divided voltage, the resistance value R1 of the heating element 1 is represented, as shown by the following expression (36).

$$R1 = \frac{(R2 + R3 + xR4)R5}{(1 - x)R4 - y(R2 + R3 + R4)} \quad (36)$$

As can be seen from expression (36), by changing the voltage division ratios x, y of the amplifier sections 7, 7H, the resistance value, i.e., the temperature, of the heating element 1 can be adjusted.

As described above, according to the fifteenth embodiment of the present invention, the temperature of the heating element 1 can be adjusted only by sending an electric signal for adjustment from an external computer, so the adjustment can be made in a short time by a simple arrangement or device.

In addition, since the voltage division ratios x, y of the amplifier sections 7, 7H are decided by the ratios of the resistance values of resistors, adjustment accuracy is not influenced by the absolute accuracies of the resistors, and adjustment with a high degree of precision can be made.

Embodiment 16

Figure 21:
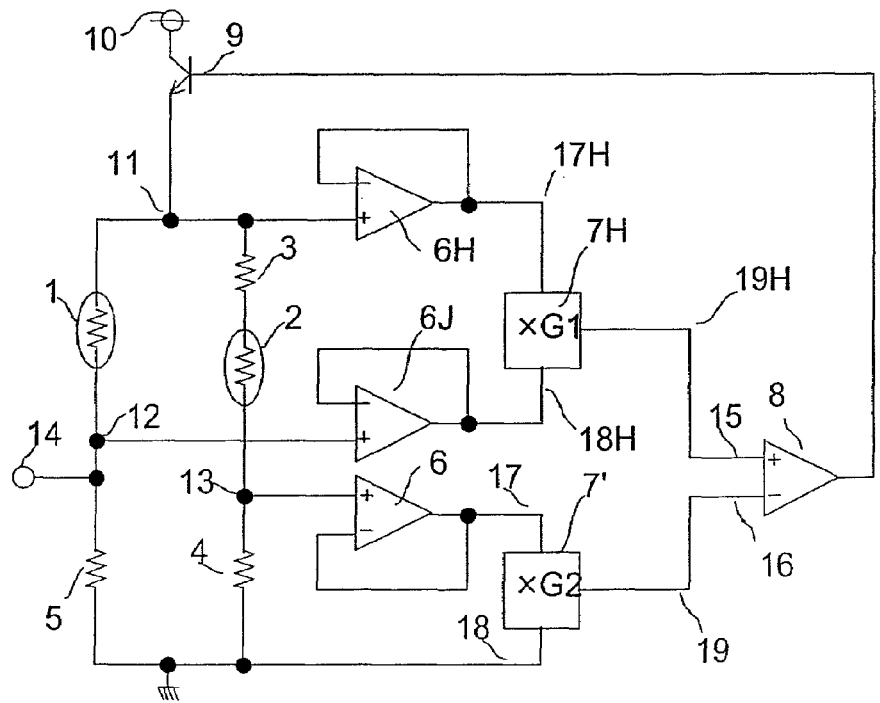
FIG. 21 is a circuit configuration diagram showing a thermal flow sensor according to a sixteenth embodiment of the present invention.

Although in the above-mentioned fifteenth embodiment, the amplification factor of each of the amplifier sections 7, 7H is set to a value equal to or less than 1, amplification factors G1, G2 of individual amplifier sections 7', 7H' may be set to values equal to or larger than 1, respectively, as shown in FIG. 21 for example.

FIG. 21 is a circuit configuration diagram that shows a thermal flow sensor according to a sixteenth embodiment of the present invention, wherein the like parts or components as those described above (see FIG. 20) are identified by the same symbols or by the same symbols with "'" affixed to their ends, while omitting a detailed explanation thereof.

In FIG. 21, the amplifier sections 7', 7H' are configured in such a manner that their amplification factors G1, G2 are equal to or larger than 1. In this case, the resistance value R1 of the heating element 1 is represented by using the amplification factor G1 of the amplifier section 7' and the amplification factor G2 of the amplifier section 7H', as shown by the following expression (37).

$$R1 = \frac{(R2 + R3 + R4 - G2R4)R5}{G2R4 - G1(R2 + R3 + R4)} \quad (37)$$

As can be seen from expression (37), by changing the amplification factors G1, G2 of the amplifier sections 7', 7H', the resistance value, i.e., the temperature, of the heating element 1 can be adjusted. Accordingly, the temperature of the heating element 1 can be adjusted only by sending an electric signal for adjustment from an external computer, so the adjustment can be made in a short time by a simple arrangement or device. In addition, the amplification factors G1, G2 of the individual amplifier sections 7', 7H' are decided by the ratios of the resistance values of resistors, adjustment accuracy is not influenced by the absolute accuracies of the resistors, and adjustment with a high degree of precision can be made.

As described in the foregoing, according to the present invention, similarly as stated above, by changing the amplification factors of the amplifier sections for each of the thermal flow sensors with individual variations by means of an electric signal, it is possible to adjust the temperature of the heating element 1 to a predetermined control temperature, so processes and apparatuses for mechanical processing such as soldering, laser trimming, etc., become unnecessary, and adjustment can be made in a short time with a simple device.

In addition, adjustment can be made while monitoring the temperature of the heating element 1 or an index indicating the temperature, so an adjustment process or step becomes simple.

Further, each of the amplification factors (G1, G2) is decided by the ratio of a resistor array (or a capacitor array, or the opened and closed times of the switches, etc.), so the absolute accuracies of individual circuit elements are not required, and hence adjustment with a high degree of precision can be made even if highly accurate elements are not used.

While the invention has been described in terms of preferred embodiments, those skilled in the art will recognize that the invention can be practiced with modifications within the spirit and scope of the appended claims.

What is claimed is:

1. A thermal flow sensor in which
   a first bridge circuit is composed of a first heating element arranged at an upstream side with respect to a forward flow of fluid, a first fluid temperature detection element arranged at a location free from the influence of heat from said first heating element, and a plurality of first resistors;
   a second bridge circuit is composed of a second heating element arranged at a downstream side with respect to a forward flow of fluid, a second fluid temperature detection element arranged at a location free from the influence of heat from said second heating element, and a plurality of second resistors; and
   a flow rate of said fluid is detected by using the fact that an amount of heat transmitted from said first and second heating elements to said fluid in a state where said first and second heating elements are always held at a control temperature higher by a predetermined value than the temperature of said fluid detected by said first and second fluid temperature detection elements depends on the flow rate of said fluid;
   said thermal flow sensor comprising:
   a first amplifier section that amplifies a voltage across opposite ends of at least one of said plurality of first resistors;
   a first current control section that is controlled based on an output voltage of said first amplifier section;
   a first junction comprising one end of said first heating element which is controlled to be energized through said first current control section;
   a second amplifier section that amplifies a voltage across opposite ends of at least one of said plurality of second resistors;
   a second current control section that is controlled based on an output voltage of said second amplifier section;
   a second junction comprising one end of said second heating element which is controlled to be energized through said second current control section; and
   an output terminal that is connected to said first and second junctions for outputting a detection result corresponding to the flow rate of said fluid;
   wherein each of said first and second amplifier sections comprises an amplifier part that amplifies an input signal to said amplifier sections, and an amplification factor control part that controls an amplification factor of said amplifier part;

said first and second amplification factor control parts in said first and second amplifier sections change the amplification factors of said amplifier parts in said first and second amplifier sections, respectively, by means of an electric signal so that the temperatures of said first and second heating elements are adjusted to said control temperature.

* * * * *

UNITED STATES PATENT AND TRADEMARK OFFICE
CERTIFICATE OF CORRECTION

| | | |
|---|---|---|
| PATENT NO. | : 7,562,569 B2 | Page 1 of 1 |
| APPLICATION NO. | : 12/209706 | |
| DATED | : July 21, 2009 | |
| INVENTOR(S) | : Kazuhiko Ohtsuka and Yuji Ariyoshi | |

It is certified that error appears in the above-identified patent and that said Letters Patent is hereby corrected as shown below:

On the title page, Item (62) for Related U.S. Patent Application Data currently reads:

(62)   Division of application No. 12/013,590, filed on Jan. 14, 2008, now Pat. No. 7,487,674.

and should read:

(62)   Division of application No. 12/013,590, filed on Jan. 14, 2008, now Pat. No. 7,487,674, which is a division of application No. 11/414,344, filed on May 1, 2006, now Pat. No. 7,325,449.

Signed and Sealed this

Second Day of February, 2010

David J. Kappos
*Director of the United States Patent and Trademark Office*